United States Patent [19]
Adachi

[11] Patent Number: 5,392,167
[45] Date of Patent: Feb. 21, 1995

[54] DATA RECORDING METHOD, END SEARCH METHOD AND CONNECTION RECORDING

[75] Inventor: Tatsuya Adachi, Neyagawa, Japan

[73] Assignee: Matsushita Electric Industrial Co., Ltd., Osaka, Japan

[21] Appl. No.: 137,215

[22] Filed: Oct. 18, 1993

Related U.S. Application Data

[63] Continuation of Ser. No. 626,299, Dec. 12, 1990, abandoned.

[30] Foreign Application Priority Data

Dec. 12, 1989 [JP] Japan .................. 1-322150

[51] Int. Cl.⁶ ..................... G11B 5/02; G11B 15/52
[52] U.S. Cl. ........................... 360/27; 360/69; 360/72.1; 360/74.4
[58] Field of Search ............. 360/69, 72.1, 72.2, 360/74.4, 27

[56] References Cited

U.S. PATENT DOCUMENTS

| | | | |
|---|---|---|---|
| 4,321,632 | 3/1982 | Leis et al. | 360/49 |
| 4,445,150 | 4/1984 | Nakajima et al. | 360/18 |
| 4,587,577 | 5/1986 | Tsunoda | 360/72.2 |
| 5,251,075 | 10/1993 | Yoshida et al. | 360/18 |

FOREIGN PATENT DOCUMENTS

| | | | |
|---|---|---|---|
| 0203797A2 | 5/1986 | European Pat. Off. | 360/72.2 |
| 0323910A2 | 1/1989 | European Pat. Off. | 360/74.4 |
| 3020602A1 | 2/1981 | Germany . | |
| 3145650A1 | 11/1982 | Germany . | |

*Primary Examiner*—David L. Robertson
*Attorney, Agent, or Firm*—Wenderoth, Lind & Ponack

[57] ABSTRACT

In a data recording method, successive frames of main data and auxiliary data are recorded on a recording tape. The auxiliary data includes control information regarding the main data. A main data completion point indication is recorded in a track of the auxiliary data prior to a corresponding location of a track of the main data at which recording of the main data is completed. Also, a continuous data flag is recorded at a location in the auxiliary data track corresponding to the location of the main data track at which recording of the main data is completed. The continuous data flag indicates that the recorded main data continues at a corresponding location and an opposite plane of the recording tape. When a recorded data region end search is carried out, the tape running direction is reversed upon detection of the continuous data flag in the auxiliary data track.

10 Claims, 16 Drawing Sheets

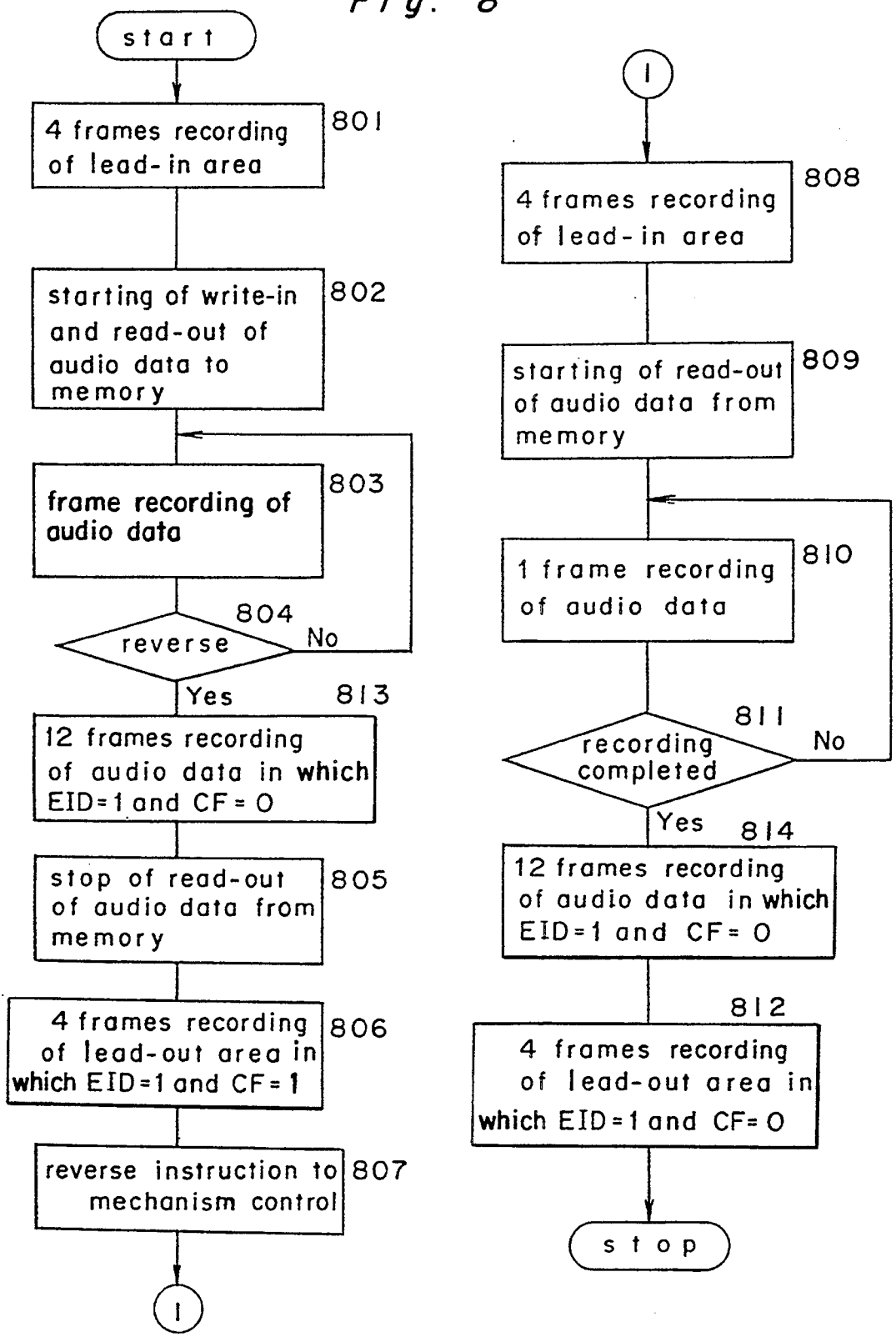

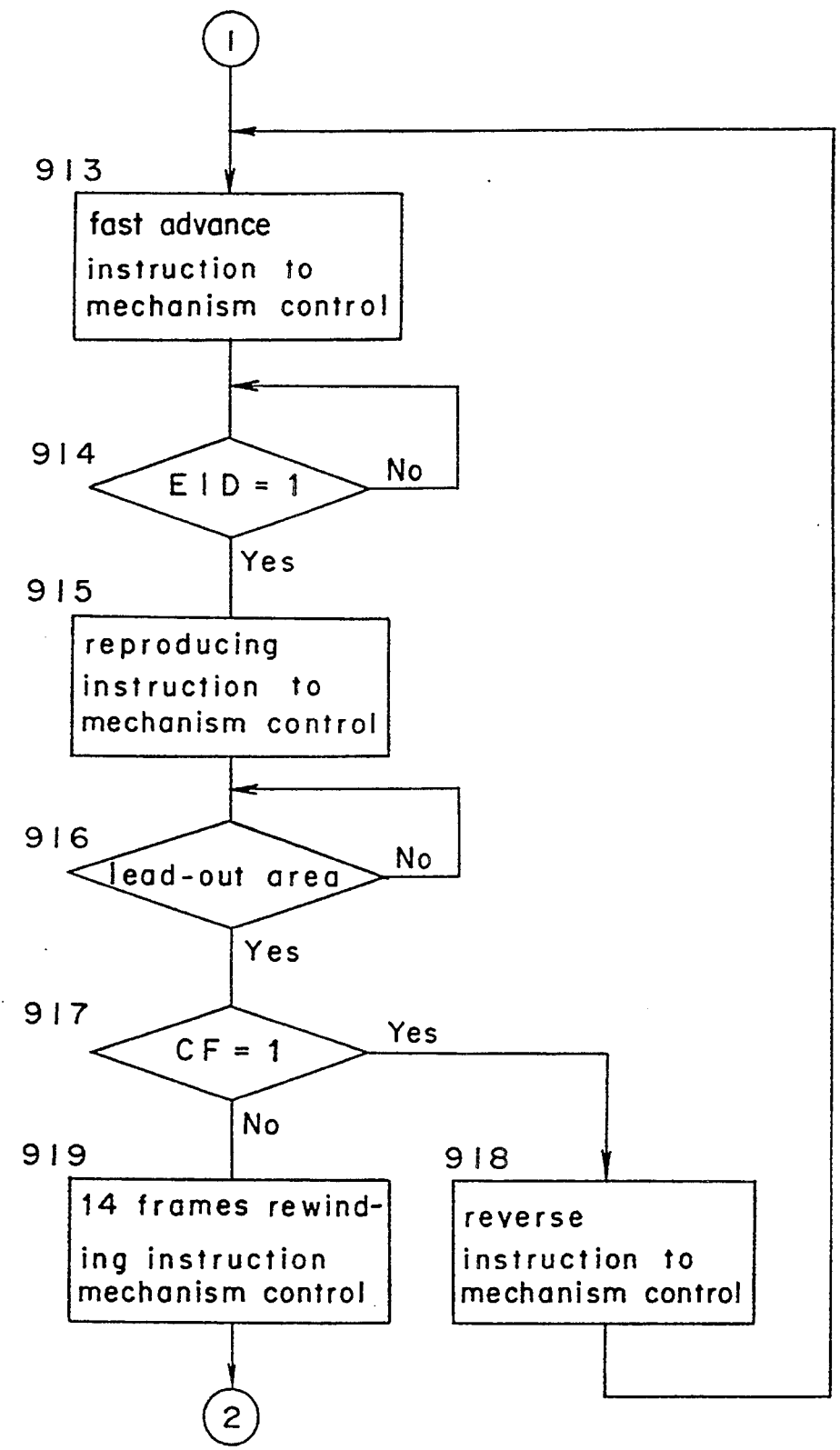

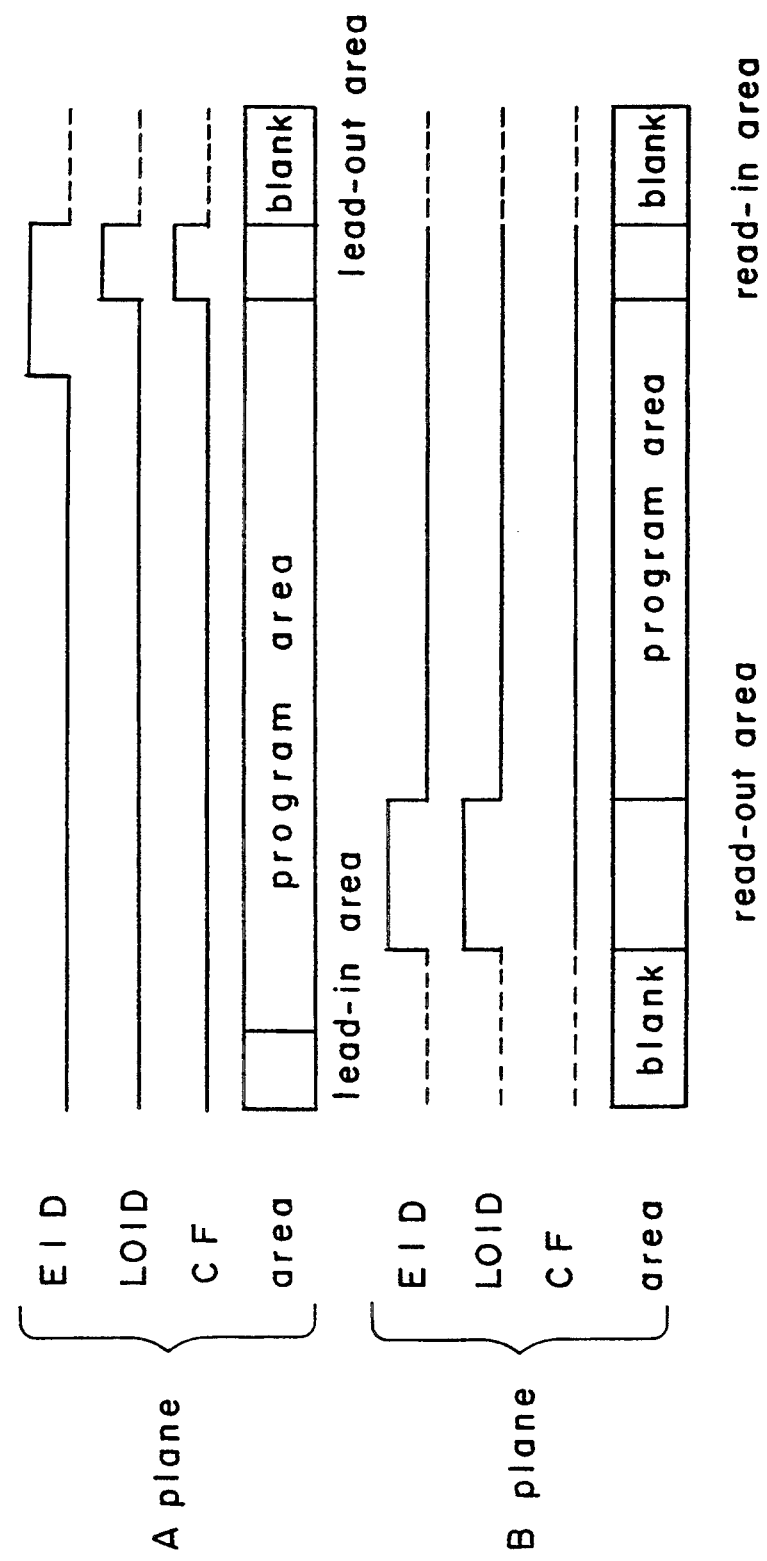

DATA RECORDING METHOD, END SEARCH METHOD AND CONNECTION RECORDING

This application is a continuation of now abandoned application, Ser. No. 07/626,299, filed Dec. 12, 1990.

BACKGROUND OF THE INVENTION

The present invention generally relates to a method of searching for an end point (completion point) of a recorded data region (hereinafter referred to as a recorded data region end search method) of a recording medium in a recording and reproducing apparatus, particularly an S-DAT (e.g., a stationary head system digital audio tape recorder) having both forward and backward tape recording running directions, and to a method of recording data appended to an already recorded region on a recording medium (hereinafter referred to as a connecting data recording method), and to a method of recording control data to be used in the connecting data recording and recorded data region end search methods.

In a recording apparatus such as, for example, a compact cassette, an S-DAT and an R-DAT (rotary head system digital audio tape recorder), recording end point information to be read during normal reproduction and during a high speed search is recorded at the completion point of a recorded data region on the recording medium. This recording completion point information is used as a guide in a case where a new data region is to be recorded contiguous to the prior recorded region. The subsequent portion is not accessed by reference to the recording completion point information provided as a guide of the final point of the effective region on the magnetic tape, so that undesired data is not read by mistake. It is well known and recommended that a lead out area indicative of the trailing end of a recorded data region also be recorded. See page 89 to page 90 of the "THE DAT CONFERENCE STANDARD, DIGITAL AUDIO TAPE RECORDER SYSTEM" (DOCUMENT 1) issued by the DAT consultant conference in June, 1987. The reasons why the recording of the lead out area is necessary are as follows.

1. As a guide in the connecting data recording.
2. As a guide of the completion point of an effective data region.

Particularly, the lead out area becomes necessary when overwriting prior recorded data in a case where a completion point of the prior recorded data region is after the completion point of a later recorded data region where the new signal has been recorded. The location of a completion point recorded data associated with the prior recorded data cannot be regarded as the completion point of the later recorded data.

Although it is possible to detect the completion point of the recorded data through detection of a non-recorded portion in the case of a first recording on a tape, the completion point of the recording may be detected more positively and more quickly if the lead out area is recorded. This is because it is necessary to confirm a non-recorded condition of a number of frames to positively detect the non-recorded position, instead of a burst error caused by drop out. Although the data completion point can be identified by the non-recorded portion, the completion point may be identified more immediately when a recorded lead out area is detected.

In, for example, the R-DAT, the lead out area is recorded for 300 frames or more. When the lead out area is detected during a recorded data region end search, the tape running operation is stopped and the tape is rewound several frames to enter a standby condition for the connecting data recording. The connecting data recording means effects recording so that the phase and so on of a frame is continuous with already recorded frames. The recording position of the already recorded frame must be confirmed so as to read the time record, the frame number and so on before the connecting data recording. Also, as the tape speed must be made constant before the start of recording, and the tape must be run for a period of several frames to achieve the necessary constant tape speed. Therefore, the rewinding operation is effected for several frames after the detection of the lead out area, and then a standby condition is entered.

A frame includes a plus azimuth track recorded by a plus azimuth head and a minus azimuth track recorded by the minus azimuth head in the case of the R-DAT. Hereinafter, a frame is a minimum unit which can be independently recorded and reproduced.

Also, a lead out area ID is recorded in a sub ID area of auxiliary data. The data to be used for control, such as the lead out area ID, is called auxiliary data, in contrast with the audio data and image data, for example, which is called main data.

The R-DAT is illustrated from pages 47 to 165 of "Graphical DAT Reader" (Document 2) issued Jul. 25, 1988 by OHM-Sha. Also, the S-DAT is explained from page 42 to page 46 of Document 2.

When the recording completion point is searched by the recording and reproducing apparatus of a fixed head system having a forward and backward tape running direction, such as a compact cassette and a S-DAT, using a lead out area ID as in the above described R-DAT, the following problems arise.

1. When a recorded data region end search is performed by a recording and reproducing apparatus having two tape running directions, there is no way of telling whether the lead out area of a certain plane (upper or lower region) of the tape is a recording completion point of the entire tape or a recording completion point of the plane only.

2. Since, when the recording period of the recording completion point information is short, the recording completion point information cannot be detected positively during a high speed search and there is a possibility of missing the recording completion point.

In the recording and reproducing apparatus of a fixed head system having tape running directions in both the forward direction and the backward direction, the magnetic tape is normally divided into an upper half region and a lower half region. The upper half of the magnetic tape may be used in, for example, the recording in the forward direction, and the lower half region may be used in the recording of the backward direction. The two recording regions are called respectively an A plane and a B plane. The B plane is a reverse plane with respect to the A plane and the A plane is a reverse plane with respect to the B plane.

The above described problem point 2 will be described hereinafter in further detail.

As the head crosses the recording track obliquely in the case of an R-DAT, the head speed is not changed in proportion to the tape speed, and the control data is not always read for every track. Thus, the lead out area of the R-DAT is determined to record continuously by 300 frames. Although the head does not obliquely cross the tracks in the case of the S-DAT, the bit rate of the reproduction signal changes in proportion to the changes in the tape speed, so that the bit rate changes considerably during the operation of increasing the tape speed and extraction of the reproduction clock is hard to effect, with a probability of reading the data correctly being reduced as compared with that of the normal reproduction time. Therefore, in the case of the S-DAT, the probability of missing the lead out area must be reduced by recording a lead out area having a longer recording period.

SUMMARY OF THE INVENTION

The data recording method and the recorded data region end search method of the present invention are to overcome the above described problems. Accordingly, an essential object of the present invention is to provide a data region end search method comprising the steps of reversing the tape running direction to effect an end searching operation of the reverse plane if a continuous recording flag is effective when the lead out area has been detected during the end search, entering into a standby condition for connecting data recording if the continuous recording flag is not effective, and searching for the recording completion point of the entire tape so that the connecting data recording operation may be effected, according to the effectiveness of the continuous recording flag showing that the recording completion point of the first plane and the recording start point of the second plane coincide with each other.

The data showing the completion point of the recording is divided into two data. One data denotes that a long recording operation is effected so that the detection may be simplified even during high speed searching, and the other data denotes that the recording operation may be effected at a minimum period even upon reversal of the tape running direction.

Another important object of the present invention is to provide a data recording method comprising the steps of defining the recording completion point ID of both an end ID and the lead out area ID, starting the recording in the end ID prior to the lead out area so that the detection may be simplified even during a high speed search, starting the recording of the lead out area ID after the recording completion of the main data, continuing the recording of the end ID and the lead out area ID up to the recording completion time point so that a sufficient recording period is achieved for the end ID which is the recording completion point information for high speed search, the lead out area ID showing the completion of the main data may be of a minimum recording period.

The lead out area subsequent to the recording completion point need not be recorded at all, so that the period during which recording interrupted during the tape reversal may be made shorter. In this case, the end ID recording section length may be a given value so that the recording completion point of the main data may be accurately determined. Alternatively, the location of the recording completion point of the main data may be detected if the area subsequent the recording completion point are kept non-recorded in accordance with an address provided in the end ID section.

The connecting data recording method of the present invention overcomes a problem to be caused when the above described data recording method has been used.

If the connection recording is effected through erasure of the end ID when the end ID is recorded prior to the recording completion point of the main data, there is a problem in that one portion of the major data is erased. The connecting data recording method of the present invention starts the recording of the auxiliary data from the frame where the end ID changes from ineffective to effective prior to the recording completion of the main data, and records both the auxiliary data and the main data from the next frame to the frame of the recording completion of the main data so that the main data of the portion with the end ID being written may not be erased.

BRIEF DESCRIPTION OF THE DRAWINGS

These and other objects and features of the present invention will become apparent from the following description taken in conjunction with the preferred embodiment thereof with reference to the accompanying drawings, in which;

FIG. 8 is a flow chart showing a procedure of a data recording method in the second embodiment of the present invention;

FIGS. 9(a)-(c) are a flow chart showing the procedures of a recorded data region end searching method and a connecting data recording method in a second embodiment of the present invention;

FIG. 13 is a control data layout chart in a case where continuous recording of both planes in the third embodiment of the present invention has been effected.

DETAILED DESCRIPTION OF THE INVENTION

Figure 1:
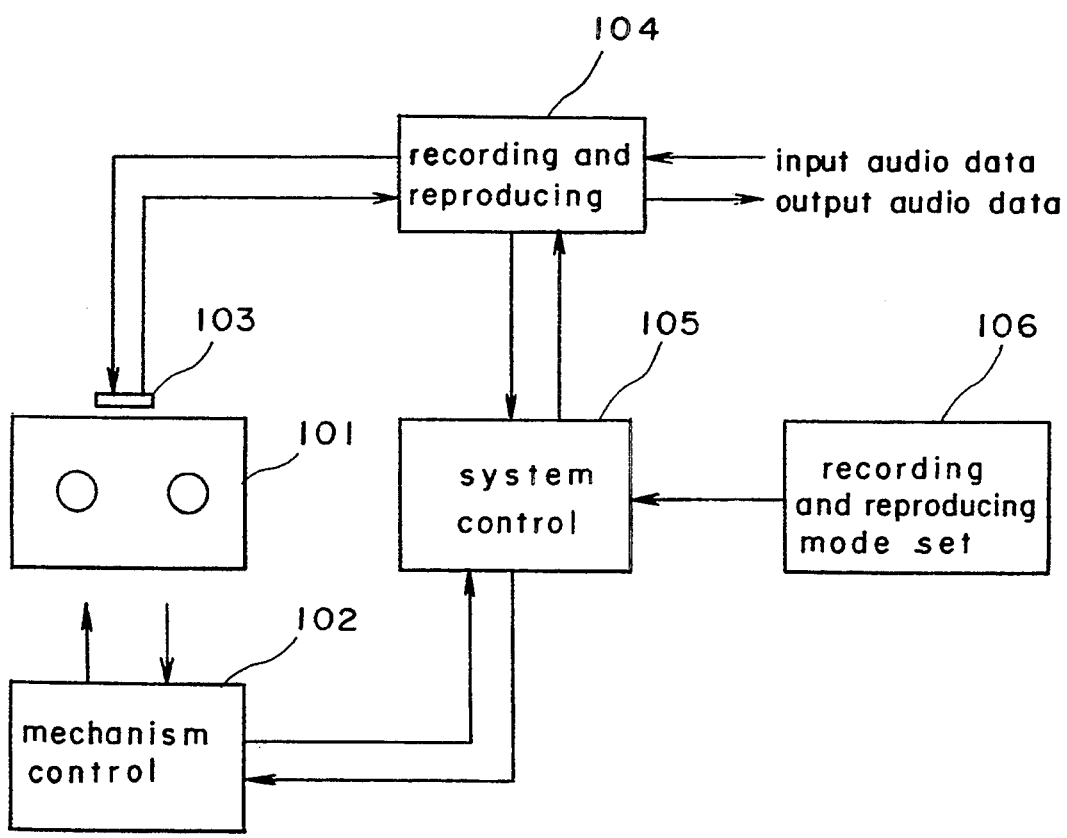
FIG. 1 is a block diagram showing the construction of a recording and reproducing apparatus for realizing a control data recording method, a recorded data region end search method, and a connecting data recording method in a first embodiment of the present invention.

Before the description of the present invention proceeds, it is to be noted that like parts are designated by like reference numerals throughout the accompanying drawings.

Referring now to the drawings, FIG. 1 is a block diagram showing the construction of a recording and reproducing apparatus for realizing a data recording method, a recorded data region end search method, and a connecting data recording method in a first embodiment of the present invention.

Figure 11:
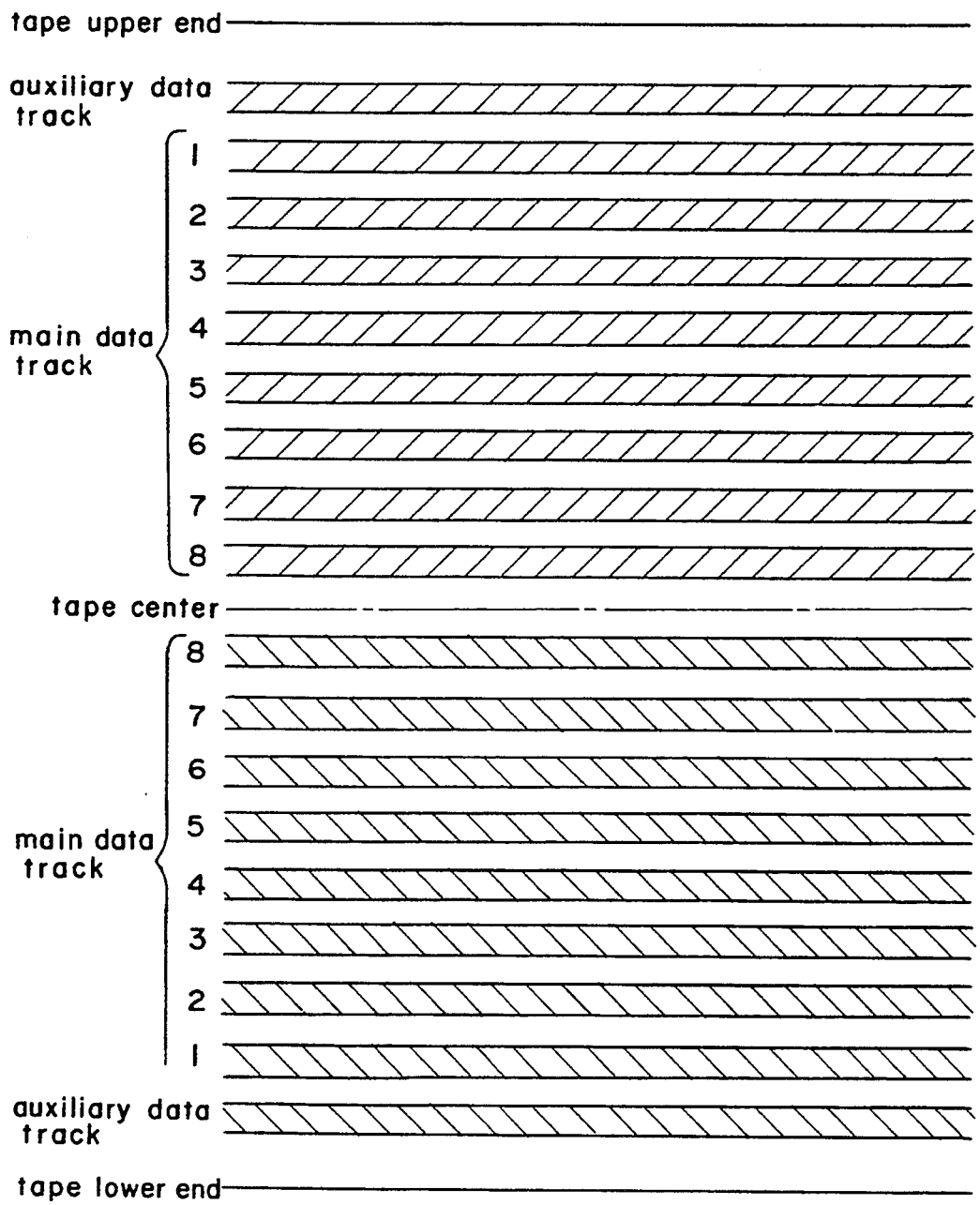
FIG. 11 is a chart showing recording track patterns on a tape recorded by the recording head in the first embodiment of the present invention.

In FIG. 1, a cassette 101 accommodates a magnetic tape secured at both ends thereof on a reel hub. A mechanism control portion 102 controls the running operation of the magnetic tape in accordance with instructions of the system control portion 105 and provides to the system control portion 105 information as to whether or not the magnetic tape has advanced close to the tape end thereof. A recording and reproducing head 103 effects the recording and reproducing operations with respect to the magnetic tape and is composed of nine recording heads. One of the recording heads records auxiliary data such as control data to be used for data reproduction control, and the remaining eight heads record the main data such as audio data. Also, the recording and reproducing head 103 is composed of nine reproducing heads. One of the reproducing heads reproduces the auxiliary data such as the control data used for the data reproduction control, and the remaining eight reproducing heads reproduce the main data such as the audio data. In the present embodiment, the magnetic tape is divided into an upper area and a lower area, one area (the A plane) being used for recording in a forward direction, and the other area (the B plane) being used for recording in a reverse direction. When the running direction is reversed, the heads are rotated by 180 degrees. FIG. 11 shows the record track patterns on a tape recorded by the recording heads in the first embodiment of the present invention.

A recording and reproducing portion 104, by modulation, adds an error correction code to input audio data received externally and to auxiliary data received from the system control portion 105 and outputs a resultant signal to the recording and reproducing head 103 as a recording signal. The recording and reproducing portion 104 also modulates a reproduction signal reproduced from the recording and reproducing head 103, effects error corrections to thereby generate output audio data, and extracts and outputs the auxiliary data to the system control portion 105.

The system control portion 105 generates a running mode instruction to the mechanism control portion 102, and generates a recording mode or a reproducing mode instruction to the recording and reproducing portion 104. The system control portion 105 can be realized, for example, by a microprocessor.

A recording and reproducing mode setting portion 106 provides a user instruction to the system control portion 105. The user commands a general operation such as recording, reproducing or repetitive reproducing by operating the recording and reproducing mode setting portion 106 which is composed of switches, for example.

Although audio data is used in the present embodiment, other data such as image data may also be used. Generally, such data is called the "main" data hereinafter, in contrast with the "auxiliary" data which is used for operation control.

A data recording method, a recorded data region end search method, and the connecting data recording method in a first embodiment of the present invention will be described hereinafter.

When the user instructs a recording operation in which recording is continuously effected, for example, from the A plane to the B plane, an end ID (EID=1) is recorded in the auxiliary data track at a location twelve frames immediately before the completion point of the recording of the main data in the A plane, and a lead out area ID (LOID=1) and a continuous record flag (CF=1) are recorded in the auxiliary data track at a location corresponding to a lead out area of the recorded main data. The continuous record flag (CF=1) denotes the continuation of recorded main data onto the B plane after the completion of recorded main data on the A plane. After recording in the A plane of a four frame lead out area is complete, the running direction of the tape is reversed, and a lead in area denoting the start of recorded data and the continued main data are recorded in the B plane.

When the user instructs a recording operation in which the tape is rapidly forwarded to the trailing end of the A plane after the recording of the data in the A plane is complete and prior to recording data onto the B plane, the recording of the end ID (EID=1) starts twelve frames immediately before the completion point of the recording of main data in the A plane. After the completion of recording of the main data in the A plane, the recording of the lead out area ID (LOID=1) is effected and the continuous record flag is set to zero (CF=0). After the recording of four frames in the lead out area, the recording is completed and a rapid tape forwarding operation to the trailing end of the A plane is effected.

When the user instructs a recording operation, in which the recording is effected on the A plane only, the recording of the end ID (EID=1) is started twelve frames immediately before the completion point of the recording of the main data on the A plane. Then, after the recording of the main data is complete, the recording of the lead out area ID (LOID=1) is effected and the continuous recording flag is set to zero (CF=0). After the four frame recording of the lead out area has been effected, the recording is completed.

At the time of A plane reproduction, the recorded data completion point is detected in accordance with lead out area ID (LOID=1). When the continuous recording flag (CF=1) has been recorded, indicating that continuous data recording has been effected on the B plane, the tape running direction is immediately reversed to effect reproduction of the B plane. When the user has instructed reproduction of both planes and when the continuous recording flag has not been set (CF=0), upon detecting the recording completion point (LOID=1) in the A plane, a rapid forwarding is effected immediately to the trailing end of the A plane, the running direction is reversed, and the B plane is reproduced. When the user has instructed reproduction of the A plane only, a rewinding operation is immediately effected towards the leading end of the A plane upon detecting the recording completion point (LOID=1).

When searching for the end of recorded data, if the end ID (EID=1) and the continuous recording flag (CF=1) are detected in one plane, the processing mode is changed from a high speed search mode to a stop mode to then effect searching in the opposite direction to detect the end ID in the other plane. But when the continuous recording flag is active (CF=0), the processing mode is changed from a high speed search mode to a reproducing mode. When a lead out area ID (LOID=1) has been detected, a rewinding reproduction is effected, and the frame locations in which the end ID and the lead out area ID become active are stored and the process comes to a stop. If the user instructs connecting data recording thereafter, the connecting data recording is effected using the information of the thus stored frame locations.

Figure 2:
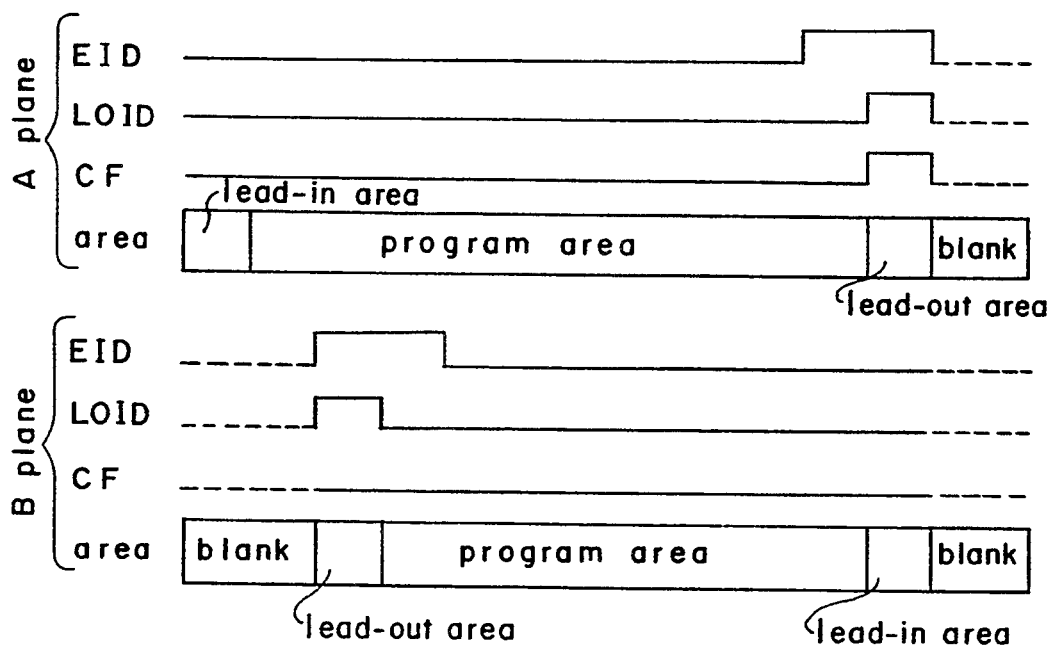
FIG. 2 is a control data layout chart in a case where continuous recording on both planes in the first embodiment of the present invention has been effected.
Figure 3:
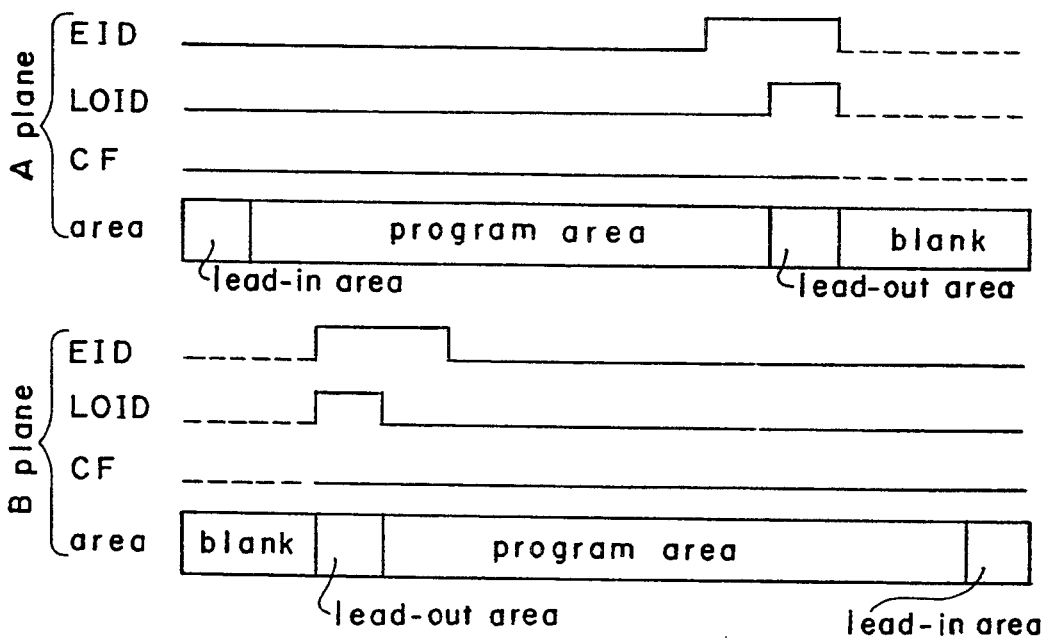
FIG. 3 is a control data layout chart in a case where discontinuous recording on both planes in the first embodiment of the present invention.
Figure 4:
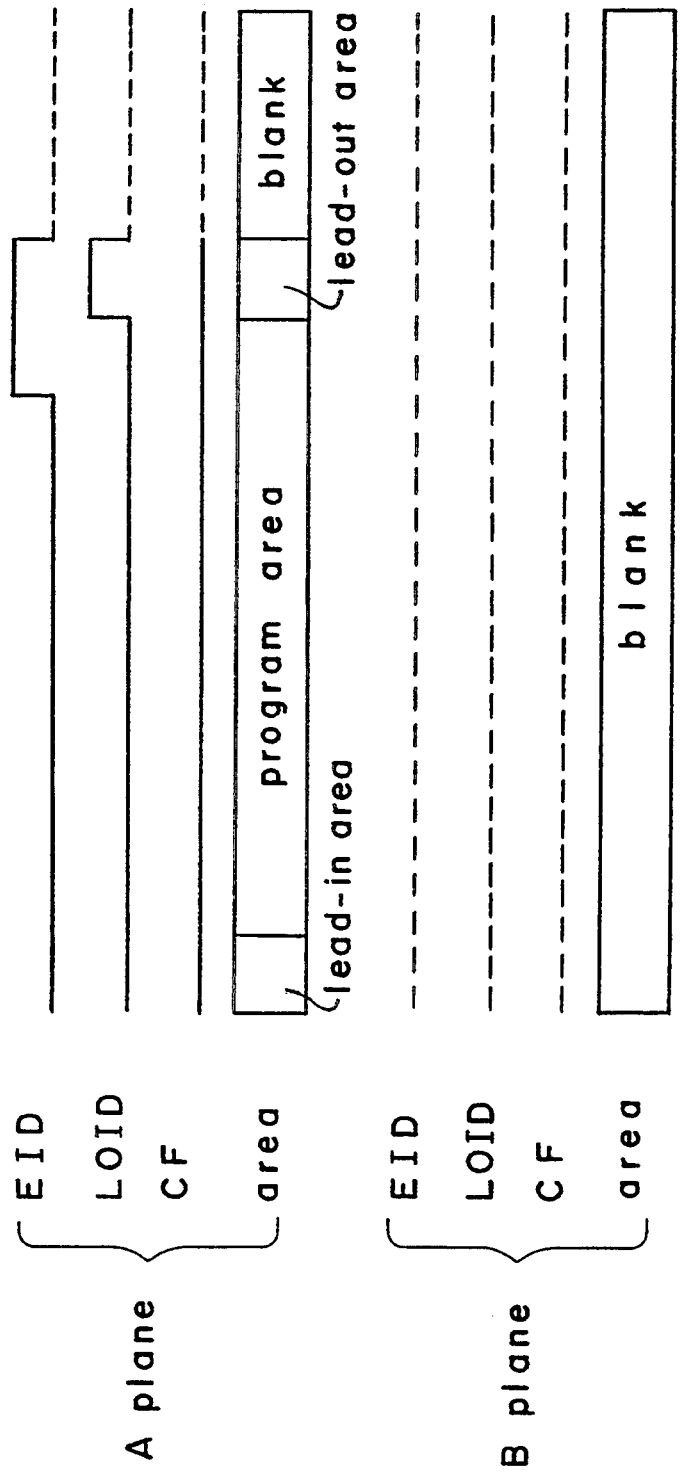
FIG. 4 is a control data layout chart when the recording of the A plane has been effected in the first embodiment of the present, invention.

FIG. 2, FIG. 3 and FIG. 4 show control data layout charts of recorded control data on a tape in the first embodiment of the present invention.

FIG. 2 is a control data layout chart in a case where the continuous recording of main data in both planes has been effected. FIG. 3 is a control data layout chart in a case where discontinuous recording of main data in both planes has been effected. FIG. 4 is a control data layout chart where recording of the A plane only has been effected.

In FIG. 2, a lead in area of four frames is recorded at the leading end of the A plane, and thereafter a program area is formed in which the main data is recorded. Then the end ID (EID) is set to 1 twelve frames immediately before the recording completion point of the main data. The continuous recording flag CF is raised to 1 and the lead out ID (LOID) is set to 1 at the location of a lead out area which is formed of four frames. After the lead out area in the A plane is recorded, the tape running direction is immediately reversed to record the lead in area and the program area containing the continued main data in the B plane. Then, the end ID (EID) is raised to 1 twelve frames immediately before the recording completion point of the main data with the continuous record flag CF remaining 0. Then, the lead out area is formed of four frames with the continuous recording flag CF remaining 0.

The lead in area is provided as a spare area at the start of the tape running operation to increase the operation stability thereof. A lead in area ID (LIID=1) is recorded in the auxiliary track at a location corresponding to the lead in area. The program area is an area where the main data is recorded. The lead out area is an area following the completion point of the recording of the main data. The end ID (EID) identifies a location before the completion point of the main data recording, so that a high speed search for the end of the program area can be effected. The relationship between the lead in area ID (LIID), the lead out area ID (LOID), the lead in area, the program area, and the lead out area is as follows:

Lead in area: LIID=1, LOID=0
Program area: LIID=0, LOID=0
Lead out area: LIID=0, LOID=1

FIG. 3 is a control data layout chart in which a lead in area is recorded for a predetermined period from the leading end of the A plane, and thereafter a program area for recording the main data is formed. Then, the end ID is raised to 1 (EID=1) twelve frames immediately before the recording completion point of the main data, and a lead out area is formed of four frames with the continuous recording flag CF remaining 0. A rapid tape forwarding operation is effected to the trailing end of the A plane immediately after recording completion of the lead out area. The tape running direction is then reversed to record a lead in area of four frames and then a program area in the B plane. Then, the end ID is raised to 1 (EID=1) twelve frames immediately before the recording completion point of the main data in the B plane. A lead out area is then formed of four frames with the continuous recording flag CF remaining 0.

FIG. 4 is a control data layout chart area in which a lead in area is recorded for a given period from the leading end of the A plane, and thereafter a program area for recording the main data is formed. Then, an end ID is raised to 1 (EID=1) twelve frames immediately before the recording completion point of the main data. A lead out area is formed of four frames after the recording of the twelve frames of main data with the continuous recording flag CF remaining 0.

Figure 5:
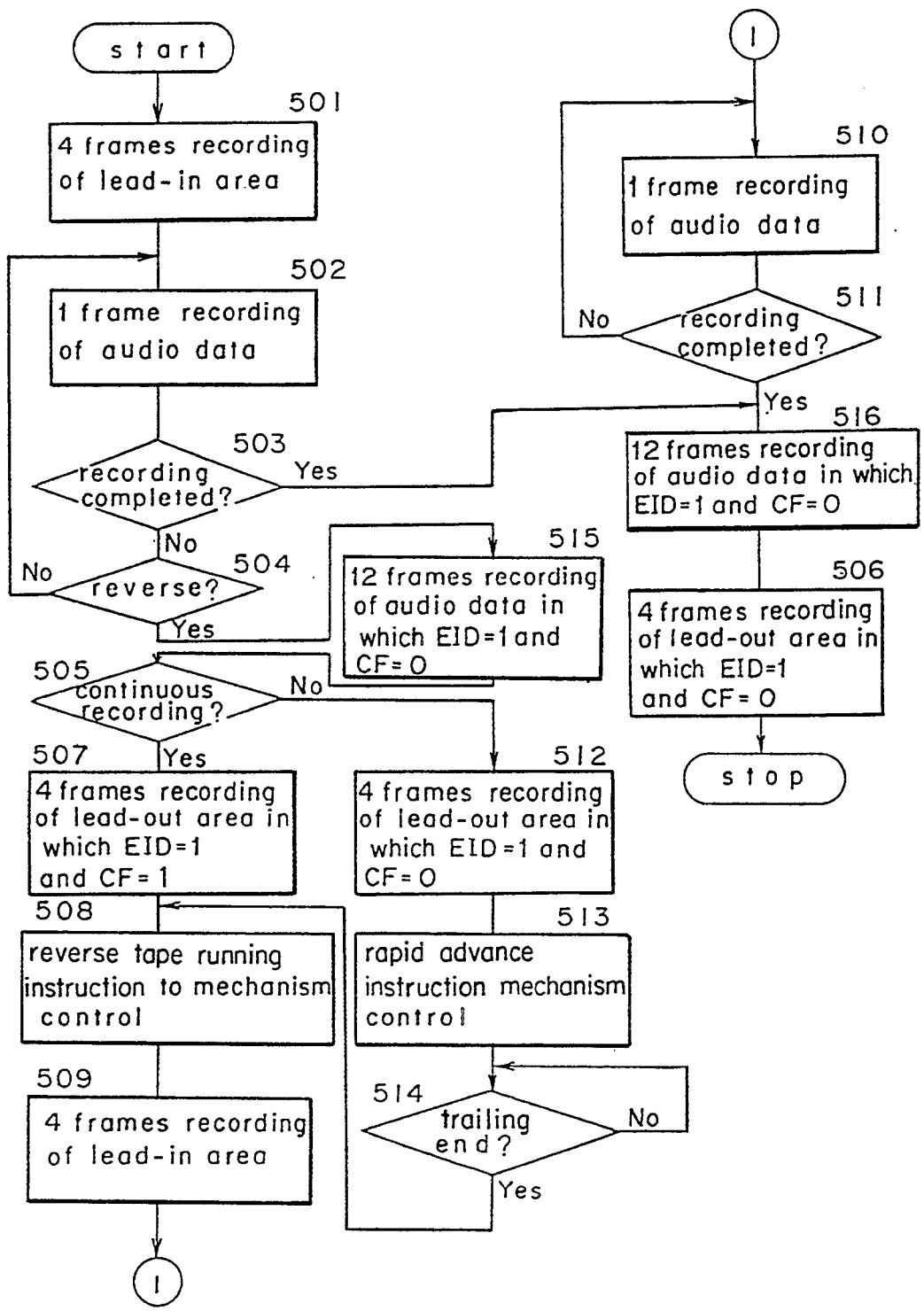
FIG. 5 is a flow chart showing a procedure of a data recording method in the first embodiment of the present invention.

FIG. 5 is a flow chart showing a data recording method in a first embodiment of the present invention in which the main data is audio data. The processing is effected at the system control 105 shown in FIG. 1.

At step 501, a four frame lead in area is recorded at the leading end of the A plane. It is noted that a "frame" denotes a minimum unit which can be recorded independently on the tape.

At step 502, one frame of audio data is recorded.

At step 503, the processing branches to step 516 when an instruction denoting recording completion has been received from the recording and reproducing mode setting portion 106, and otherwise the processing branches to step 504.

At step 516, twelve frames of the audio data are recorded and the end ID is set to 1 (EID=1) while the continuous recording flag remains 0 (CF=0).

At step 506, a four frame lead out area is recorded with the EID=1 and the continuous recording flag CF=0 to complete the recording.

At step 504, the processing branches to step 515 when an instruction denoting reversal of the tape running direction is received from the recording and reproducing mode setting portion 106, and otherwise the processing returns to step 502. In other words, the steps 502, 503 and 504 are repeated unless an instruction for reversing the tape running direction or an instruction denoting recording completion is received from the recording and reproducing mode setting portion 106.

In the present embodiment, the apparatus is adapted to allow the user to give the instruction denoting reversal of the tape running direction via the recording and reproducing mode setting portion 106. Also, the tape reversal instruction may be given automatically with the use of a trailing end detecting function and a leader tape, and the tape reversal instruction may be given automatically through detection of the completion point of an audio segment (e.g. a song) of the audio data.

Also, in the present embodiment, although the apparatus is adapted to allow the user to give the instruction denoting recording completion via the recording and reproducing mode setting portion 106, the recording completion instruction may also be issued automatically with the use of a trailing end detection function and a leader tape or by detecting the completion point of an audio segment (e.g. a song) of the audio data.

At step 515, twelve frames of audio data are recorded, in which the EID=1 and the continuous recording flag CF=0.

At step 505, the processing branches to step 507 when an instruction denoting continuous recording is received from the recording and reproducing mode setting portion 106, and otherwise the processing branches to step 512.

At step 507, a four frame lead out area is recorded in which the EID=1, the continuous recording flag CF=1 and the lead out area ID (LOID)=1.

At step 508, an instruction for reversing the running direction of the tape is issued to the mechanism control portion 102.

At step 509, a four frame lead in area is recorded in the B plane.

At step 510, one frame of the audio data is recorded in the B plane.

At step 511, the processing branches to step 516, when an instruction denoting recording completion has been received from the recording and reproducing mode setting portion 106, and otherwise the processing returns to step 510.

At step 512, a four frame lead out area is recorded in the B plane in which the EID=1, the continuous recording flag CF=0 and lead out area ID (LOID)=1 to complete the recording process.

At step 513, a rapid tape forwarding operation instruction is issued to the mechanism control portion 102.

At step 514, the processing proceeds to step 508 when information indicating that the tape trailing end has been reached is received from the mechanism control portion 102.

By the procedures described hereinabove, a tape having data composed as shown in FIG. 2 is obtained when the user has specified continuous recording in both planes, a tape having data composed as shown in FIG. 3 is obtained when the user has specified discontinuous recording in both planes, and a tape having data composed as shown in FIG. 4 is obtained when the user has specified single plane continuous recording.

The time required in the shifting from the A plane to the B plane when the user has specified continuous recording in both planes is 8P+Q, wherein 4P is the time required for recording the four frame lead out area of the A plane, Q is the time required for reversing the tape running direction, and 4P is the time required for recording the lead in area of the B plane.

Figure 6A:
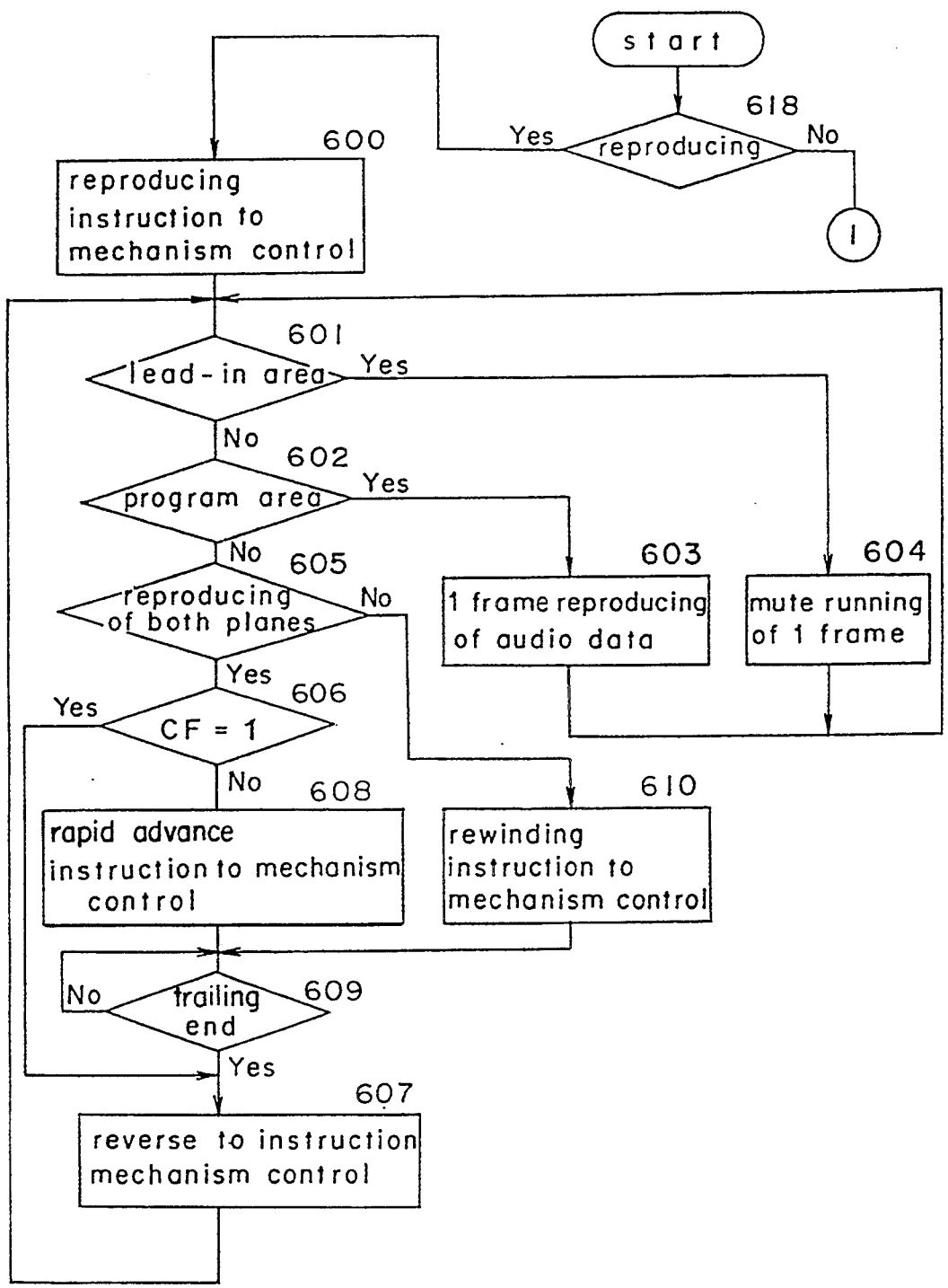
FIGS. 6(a)-(c) are a flow chart showing the procedures of a recorded data region end searching method and a connecting data recording method in a first embodiment of the present invention.
Figure 6B:
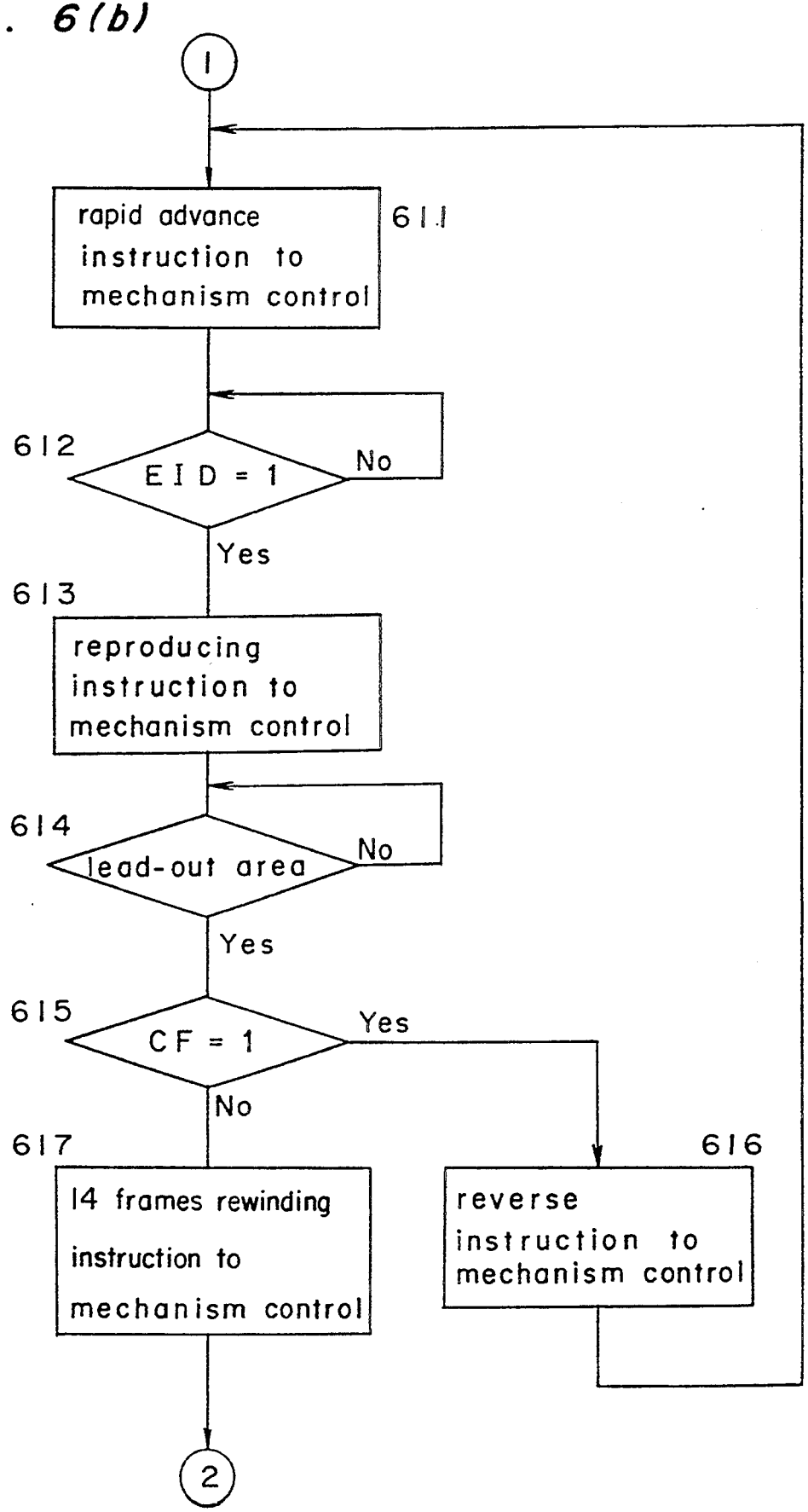
Figure 6C:
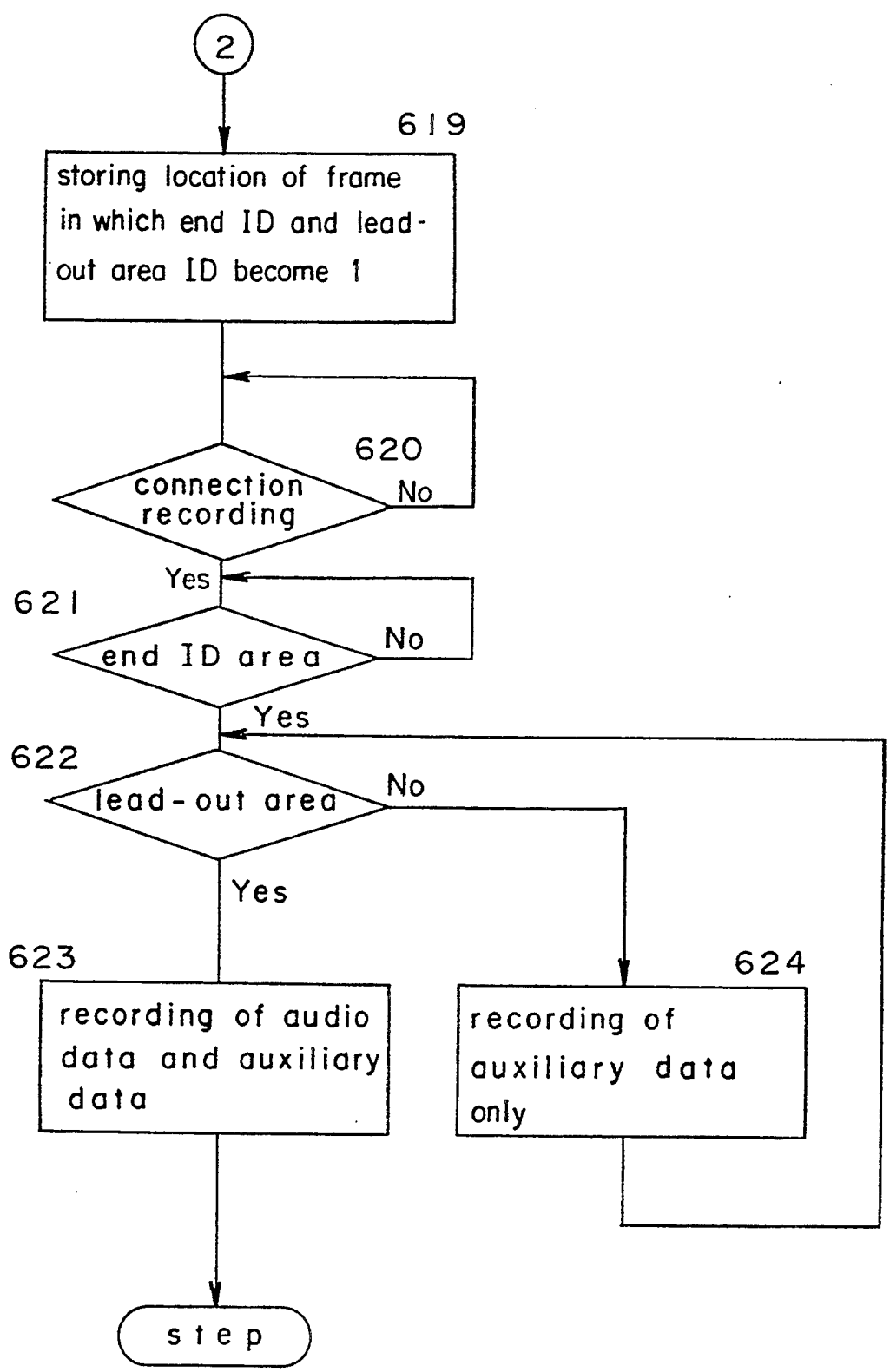

FIGS. 6(a)-(c) are a flow chart showing the recorded data region end search method and the connecting data recording method in the first embodiment of the present invention. The processing is performed by the system control portion 105 shown in FIG. 1. Although the user can specify other types of reproduction control such as, for example, reproducing both planes or reproducing a single plane at a time, a method of effecting a repetitive reproducing operation will be described here.

At step 618, the processing branches to step 600 when an instruction denoting reproduction has been received from the recording and reproducing mode setting portion 106 to start the reproduction processing, and otherwise the processing branches to step 611 to start the recorded data region end search processing.

At step 600, an instruction denoting the start of a reproducing mode is issued to the mechanism control portion 102.

At step 601, the processing branches to step 604 when a current reproduced frame is in the lead in area, and the processing otherwise proceeds to step 602.

At step 602, the processing branches to step 603 when the current reproduced frame is in the program area, and otherwise the processing proceeds to step 605. In other words, processing step 604 is effected when the reproduced frame is in the lead in area, processing step 603 is effected when the reproduced frame is in the program area, and processing step 605 is effected when the reproduced frame is in the lead out area.

At step 603, the reproduced one frame of audio data is output. At step 604, the audio output is muted for one frame portion during the tape running operation.

At step 605, the processing branches to step 606 when the user has instructed repetitive reproduction of both planes via the recording and reproducing mode setting portion 106, and the processing branches to step 610 when the user has instructed repetitive reproduction of a single plane via the recording and reproducing mode setting portion 106.

At step 606 the processing branches to step 607 when the continuous recording flag CF=1 and when the reproduced frame is in the lead out area, and the processing branches to step 608 when the continuous recording flag CF=0.

At step 607, an instructing for reversing the tape running direction is issued to the mechanism control portion 102.

At step 608, an instruction for fast forwarding of the tape is issued to the mechanism control portion 102.

At step 609, the processing proceeds to step 607 when information indicating that the tape trailing end has been reached is received from the mechanism control portion 102.

At step 610, a tape rewinding instruction is issued to the mechanism control portion 102.

At step 611, a fast forwarding instruction is issued to the mechanism control portion 102.

At step 612, the processing proceeds to step 613 when the EID=1 has been detected.

At step 613, an instruction to initiate a reproduction mode is issued to the mechanism control portion 102.

At step 614, the processing proceeds to step 615 when the presently reproduced frame is in a lead out area.

At step 615, the processing branches to step 617 when the continuous recording flag CF=0 and the reproduced frame is in the lead out area, and the processing branches to step 616 when the continuous recording flag CF=1.

At step 617, an instruction for rewinding reproduction of fourteen frames is issued to the mechanism control portion 102.

At step 616, an instruction for reversing the tape running direction is issued to the mechanism control portion 102.

At step 619, the frame location where the end ID has been changed from 0 to 1 and the frame location where the lead out area ID has been changed from 0 to 1 during the rewinding reproduction are detected and stored.

Namely, in the case where CF=0 at step 615, the fourteen frame portion of the tape is rewound and the processing enters into a standby condition for the connecting data recording.

In the case where CF=1 at step 615, the tape running direction is reversed to carry out processing step 611 again. Since the condition of CF=1 is normally present in only one of the A plane or the B plane, when the processing step 615 is effected a second time, step 617 is carried out in which the fourteen frame portion of the tape is rewound to enter the standby condition for the connecting data recording. If for some reason the processing step 615 is effected three times or more in a case where CF=1 is detected in both the lead out areas of the A plane and the B plane, a protection step for stopping the processing may be provided.

At step 620, the processing proceeds to step 621 when the user has instructed the start of connection data recording via the recording and reproducing mode setting portion 106.

At step 621, the processing proceeds to step 622 when the current reproduced frame is a frame located before the frame where the end ID (EID) has been changed from 0 to 1.

At step 622, the processing branches to step 623 when the current reproduced frame is a frame located before the frame where the lead out area ID (LOID) has changed from 0 to 1, and the processing branches to step 624 when the current reproduced frame is not the frame located before the frame where the lead out area ID (LOID) has been changed from 0 to 1.

At step 624, an instruction for recording only the auxiliary data is issued to the mechanism control portion 102 and the recording and reproducing portion 104.

At step 623, an instruction for recording the auxiliary data and the audio data is issued to the mechanical control portion 102 and the recording and reproducing portion 104.

When the user has specified repetitive reproduction of both planes using a procedure as described hereinabove, the tape running direction is immediately reversed in the lead out area when the continuous recording flag CF=1, and a fast forwarding operation is initiated in the lead out area when the continuous recording flag CF=0. Also, reversal of the tape running direction is effected when the tape trailing end is reached to start reproduction. Rewinding starts in the lead out area when the user has instructed single plane repetitive reproduction.

Also, during the user initiated recorded data region end search, when the end ID (EID=1) is detected, a reproduction mode is initiated. When the lead out area has then been read, the tape running direction is immediately reversed at the lead out area when the continuous recording flag CF=1, to thereby effect a search of the reverse plane. When the continuous reproducing flag CF=0, the standby condition for the connecting data recording is entered.

Since the end ID (EID=1) is recorded for a sixteen frame portion relative to the four frames of the lead out area, the probability of missing the end ID is reduced.

Also, when the user has instructed connecting data recording after the recorded data region end search, the new audio data is not recorded in the section extending from the rising of the end ID from 0 to 1 to the rising of the lead out area ID from 0 to 1, so that the recorded audio data is not erased and the auxiliary data only is rewritten. Both the auxiliary data and the new audio data are recorded beginning with the frame in which the lead out area ID changed from 0 to 1.

A second embodiment of the present invention will be described hereinafter with reference to the drawings.

In the second embodiment of the present invention, when the tape running direction has been reversed during a recording operation by the use of a memory, a lead out area ID is recorded after the recording completion point, and also, information obtained during recording interruption is stored. The lead out area ID is recorded after the completion of the tape running direction reversal, and thereafter the reproduction data is read out from the memory and is recorded.

At the time of reproduction, the reproduction data is sequentially stored. The data is stored already in the memory when detection has been effected of the lead out area ID. Continuous reproduction may be effected by retrieving into the memory, the reproduction data reproduced from the tape after the completion of the lead in area ID.

According to a conventional method of effecting continuous reproduction in a recording and reproducing apparatus having two tape running directions, a tape trailing end is detected by a detection means for detecting a remaining tape amount based on the number of rotations of a reel base, and the running direction of the tape is then reversed to effect the continuous reproduction. ("Digital Signal Recording, Reproducing Apparatus" disclosed in Japanese Open Patent Publication No. 59-54012 issued Mar. 28, 1984 by the Japan Patent Agency.)

However, in the conventional art, information denoting a recording completion point of the A plane and the recording start point of the B plane are not recorded on the tape by the use of such identification information as the lead out area ID, with a problem arising in that the data of the A plane and the B plane are not correctly connected.

In order to solve the drawbacks of the conventional art, a data recording method of a second embodiment of the present invention is provided.

Figure 7:
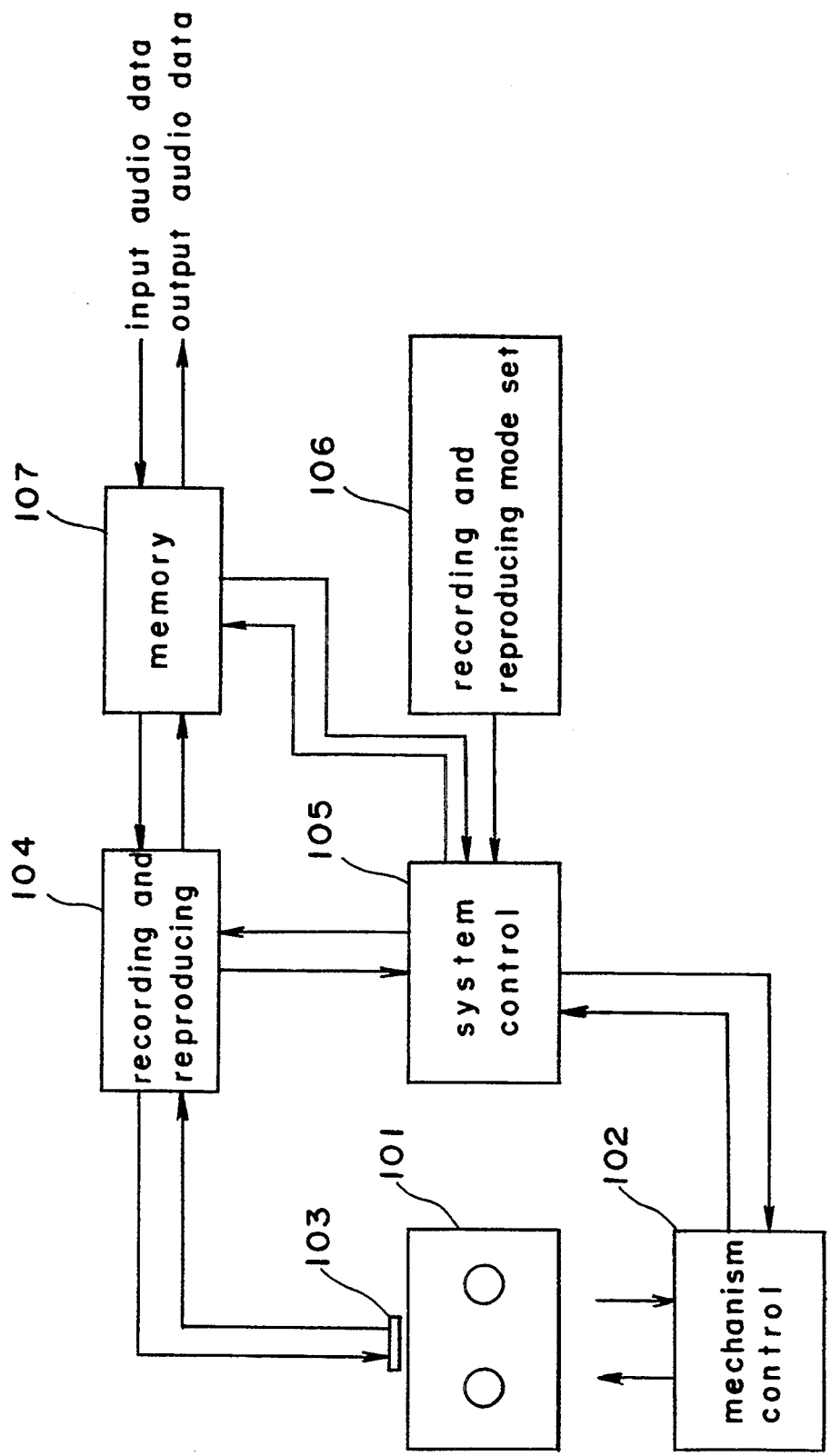
FIG. 7 is a block chart showing the construction of a recording and reproducing apparatus for realizing a data recording method, a recorded data region end searching method and a connection recording method in a second embodiment of the present invention.

FIG. 7 is a block diagram showing the construction of a recording and reproducing apparatus for realizing the data recording method of the second embodiment of the present invention. As the components 101 to 106 are similar to those of FIG. 1 of the first embodiment, the description thereof is omitted below.

In FIG. 7, reference numeral 107 is a memory for storing the input audio data and the output audio data. The memory 107 functions as a first in, first out (FIFO) memory for each of the input audio data and the output audio data. Namely, when the stored data stays within the storage capacity range of the memory, if the transfer rate of the audio data varies due to stoppage of the running tape, for example, the audio data may be inputted and outputted without overloads and underloads.

The memory 107 is controlled by the system control portion 105.

Figure 10:
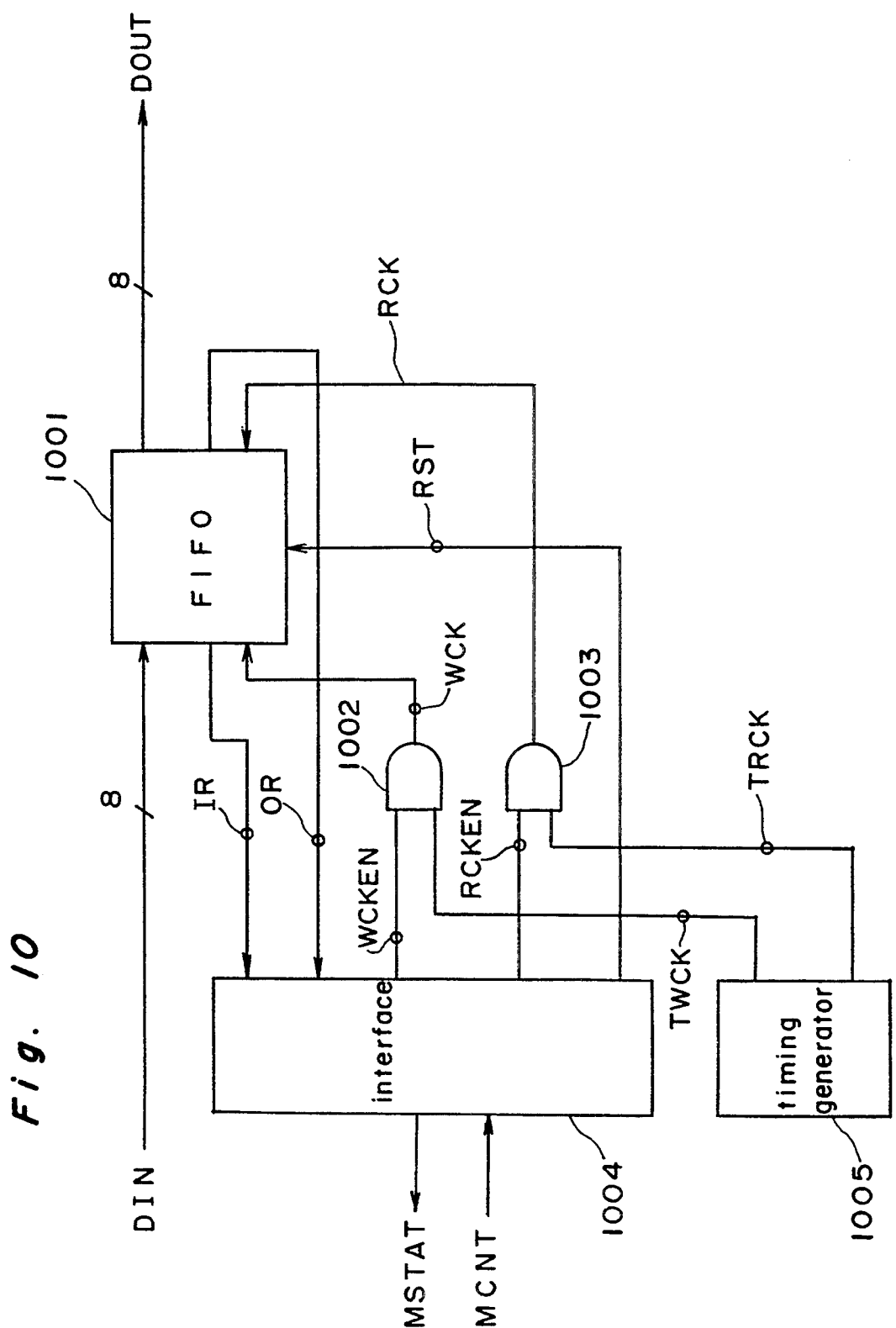
FIG. 10 is a block diagram showing in one embodiment the construction of a memory.

FIG. 10 is a block diagram showing one embodiment of the construction of the memory 107.

In FIG. 10, reference numeral 1001 is a first in, first out memory (FIFO), wherein the input data DIN of 8 bit width is stored responsive to a storing clock WCK, and the output data DOUT of 8 bit width is read responsive to a reading clock RCK. The FIFO memory 1001 is cleared when resetting is effected by a reset signal RST. Thereafter, the input data DIN is stored each time the storing clock WCK is inputted. For example, the capacity of the FIFO memory 1001 is 64 bytes and data of 64 bytes can be continuously written, data of 64 bytes can be read continuously when 64 bytes of data are stored. Also, the FIFO memory 1001 outputs a reading enable signal OR which becomes effective when the data of 1 byte or more which is not yet read exists in the memory and becomes ineffective when the memory is empty, and a writing enable signal IR which becomes ineffective when data of 64 bytes is stored in the memory and the new data cannot be further stored and becomes effective when the storing of the new data is possible. For example, the first-in, first-out memory SN74LS222 sold by Texas.Instrument Company has similar functions although it is different from the FIFO memory of the present embodiment with respect to the memory capacity and the input and output data width.

Reference numeral 1002 is an AND gate having as inputs a storing clock enable signal WCKEN supplied from an interface portion 1004 and a clock TWCK fed from a timing generating portion 1005.

Reference numeral 1003 is an AND gate having as inputs a reading clock enable signal RCKEN fed from the interface portion 1004 and the clock TRCK fed from the timing generating portion 1005.

Reference numeral 1004 is an interface portion which generates the storing clock enable signal WCKEN, the reading clock enable signal RCKEN and the resetting signal RST in accordance with a memory control signal MCNT fed from the system control portion 105, and which generates a memory condition signal MSTAT in accordance with the reading enable signal OR and the storing enable signal IR fed from the FIFO memory 1001, the signal MSTAT being fed to the system control portion 105.

Reference numeral 1005 is a timing generating portion for generating clocks TWCK and TRCK which become the source of the writing clock WCK and the reading clock RCK.

FIG. 8 is a flow chart showing the data recording method in the second embodiment of the present invention. The processing is effected by the system control portion 105 of FIG. 7.

At step 801, a four frame lead in area is recorded from the leading end of the A plane.

At step 802, the FIFO memory 107 is instructed for storing and reading the input audio data into the memory 107. At this time, the data stored is immediately read.

At step 803, one frame of the audio data is recorded.

At step 804, the processing branches to step 813, when an instruction for reversing the tape running direction is received from the recording and reproducing mode setting portion 106, and the processing otherwise returns to step 803. Namely, the steps 803 and 804 are repeated until an instruction for reversing the tape running direction is received from the recording and reproducing mode setting portion 106.

In the present embodiment, although the apparatus is adapted allow the user to issue an instruction for reversing the tape running direction via the recording and reproducing mode setting portion 106, such an instruction may be automatically issued when the use of a trailing end detection function and leader tape, and by the detection of the completion point of an audio segment (e.g. a song) in the audio data.

At step 813, twelve frames of the audio data are recorded in which EID=1 and the continuous recording flag CF=0.

At step 805, an instruction for stopping the output of the input audio data from the memory 107 is issued to the memory 107. At this time, the storing operation of the input audio data in the memory 107 is continued.

At step 806, a four frame lead out area is recorded in which the EID=1, the continuous recording flag CF=1 and the lead out area ID (LOID)=1.

At step 807, an instruction for reversing the tape running direction is issued to the mechanism control portion 102.

At step 808, a four frame lead in area is recorded in the B plane.

At step 809, an instruction for the resumption of the reading of input audio data stored in the memory 107 is issued.

At step 810, one frame of audio data is recorded in the B plane.

At step 811, the processing branches to step 814 when a recording completion instruction is received from the recording and reproducing mode setting portion 106, and otherwise the processing returns to step 810.

In the present embodiment, although the apparatus is adapted allow the user to issue the recording completion instruction via the recording and reproducing mode setting portion 106, such an instruction may be automatically issued with the use of a trailing end detection function and a leader tape, and by detection of the completion point of an audio segment (e.g. a song) in the audio data.

At step 814, twelve frames of audio data are recorded in which the EID=1 and the continuous recording flag CF=0.

At step 812, a four frame lead out area is recorded in which the EID=1, the continuous recording flag CF=0 and the lead out area ID (LOID)=1.

By such a procedure as described hereinabove, a tape having data composed as shown in FIG. 2 is obtained, the audio data is continued from the final frame of the program area of the A plane to the first frame of the program area of the B plane. All the input audio data is recorded on the tape in this manner.

The time required for changing from the A plane to the B plane is 8P+Q, where 4P is the time required for recording the four frame lead out area of the A plane, Q is the time required for reversing the tape running direction, and 4P is the time required for recording the four frame lead in area of the B plane.

Figure 9A:
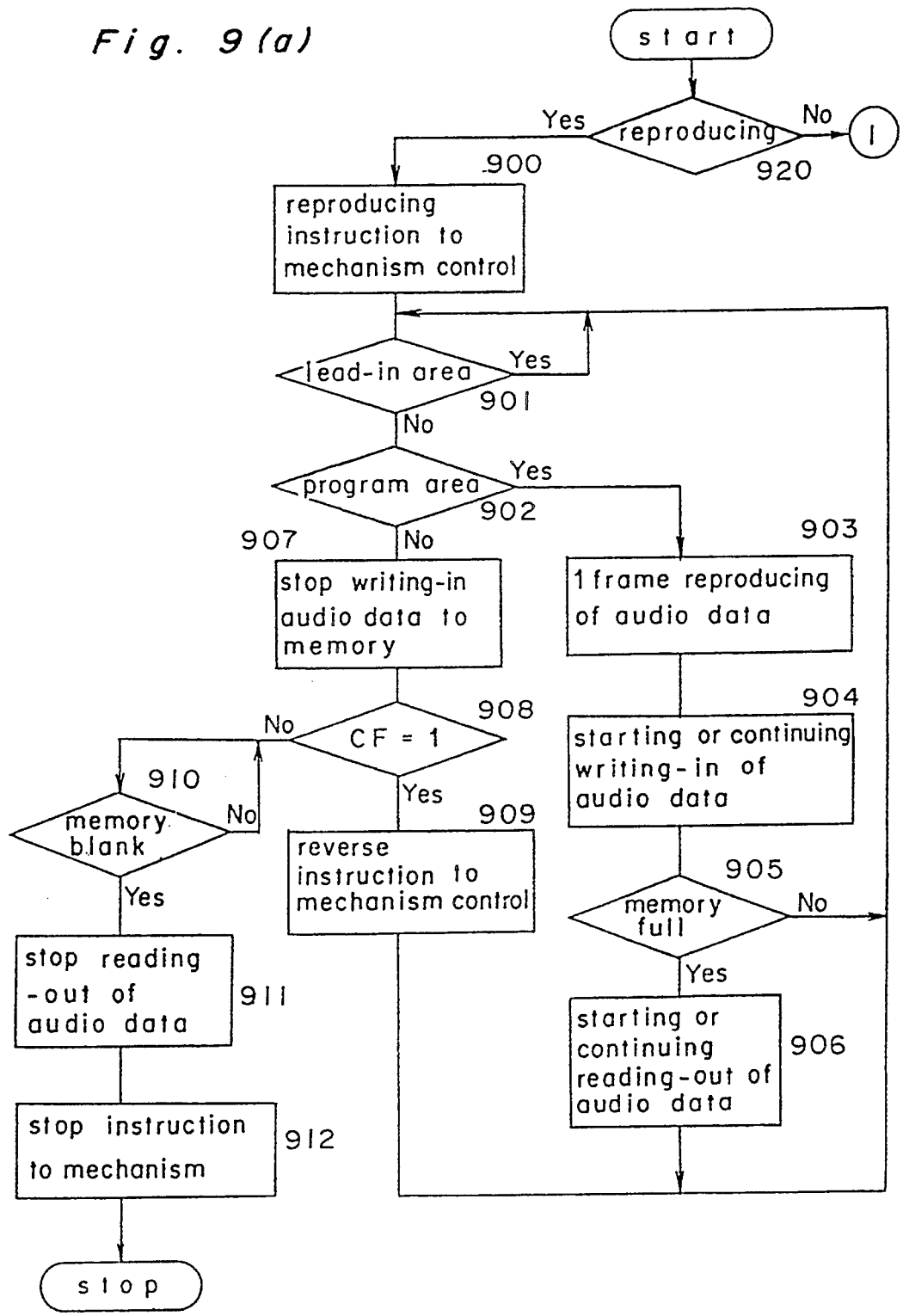
Figure 9C:
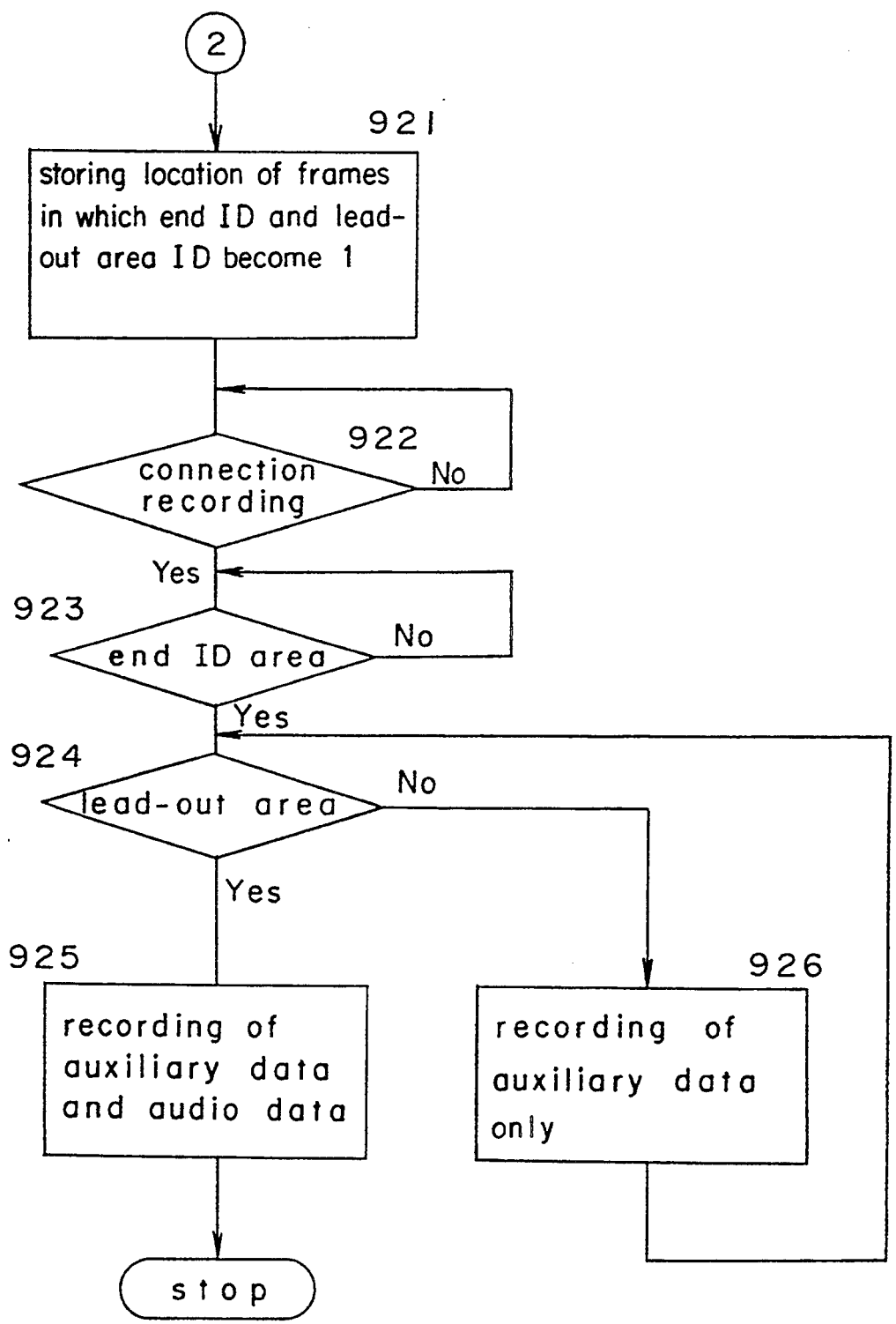

FIGS. 9(a)-(c) are a flow chart showing the recorded data region end search method and the connecting data recording method in the second embodiment of the present invention. This processing is effected in the system control portion 105 of FIG. 7. Although one time reproduction of a range specified by the user and repetitive reproduction may be effected, here a case will be described where the reproduction starts at the A plane and is completed at the B plane.

At step 920, the processing branches to step 900 when a reproduction instruction is received from the recording and reproducing mode setting portion 106 to start the reproducing processing, and otherwise the processing branches to step 913, to start the recorded data region end search processing.

At step 900, an instruction to start a reproduction mode is issued to the mechanism control portion 102.

At step 901, the processing proceeds to step 902 when a current reproduced frame is not in a lead in area.

At step 902, the processing branches to step 903 when the current reproduced frame is in the program area, and the processing branches to step 907 when the current reproduced frame is not in the program area and is thus in a lead out area. In other words, when the current reproduced frame is in the lead in area, the processing step 901 is effected, when the current reproduced frame is in the program area, the processing step 903 is effected, and when the current reproduced is in the lead out area, the processing step 907 is effected.

At step 903, one reproduced frame portion of the audio data is output to the memory 107.

At step 904, storing in the memory 107 of the reproduced audio data is started. Also, if the storing into the memory 107 of the audio data has already been started, the storing operation is continued.

At step 905, the processing proceeds to step 906 when the memory 107 is filled with reproduced audio data which has not yet been read, i.e., when the storing enable signal IR=0, and the processing returns to step 901 when the memory 107 is not filled with reproduced audio data which has not yet been read, i.e., when the storing enable signal IR=1.

At step 906, the reading of the audio data stored in the memory 107 begins. When the reading of the audio data stored in the memory 107 has already started, such reading of the audio data continues.

If the processing steps 901 through 906 are effected, the reading of the memory 107 is not effected before the memory 107 takes in audio data of T seconds from the start of the reproduction at the program area of the A plane. After the taking in of the T seconds of data, the storing of the reproduction data in the memory 107 and the reading of data from the memory 107 are effected in parallel. This is done to normally keep T seconds of audio data in reverse in the memory 107 to allow for continuous output of audio data even during a non-reproduction period in which the tape running direction is reversed.

At step 907, the storing in the memory 107 of the reproduced audio data is stopped.

At step 908, the processing branches to step 909 when the continuous reproducing flag CF=1 in the lead out area, and the processing branches to step 910 when the continuous recording flag CF=0.

At step 909, an instruction for reversing the tape running direction is issued to the mechanism control portion 102.

At step 910, the processing proceeds to step 911 when reading of the audio data from the memory 107 results in the memory 107 becoming empty, i.e., when the reading enable signal OR=0.

At step 911, the reading of the audio data from the memory 107 is stopped.

At step 912, an instruction for stopping the tape running is issued to the mechanism control portion 102. Namely, when the continuous recording flag CF=0 in the lead out area of the A plane, all data reserved in the memory 107 is sequentially outputted for T seconds by the processing step 910 through 912 and then, the processing comes to a stop.

On the other hand, when the tape running direction is reversed by the processing step 909 to change the reproduction to the B plane, the processing step 901 is effected again. The processing steps 901 through 903 are then carried out similarly as in the reproduction of the A plane. In the processing step 904, the storing in the memory 107 of the reproduced audio data is resumed. Assume that the time before the storing into the memory 107 of the audio data is resumed in the processing step 904 during the reproducing processing of the B plane from the stoppage of the storing of A plane reproduced audio data into the memory 107 in the processing step 907 is U seconds, and the storing of the reproduction data and the reading of the prior stored data of (T-U) seconds are adapted to be effected in parallel at the time of reproduction of the B plane. Accordingly, the decision result of the processing step 905 becomes No (negative) and the processing proceeds to the processing step 901. But since the reading of the audio data is not stopped, a continuing operation is effected until the lead out area of the B plane arrives.

Namely, during the reproduction of the program area of the A plane, the storing of the reproduced audio data and the reading of T seconds of prior stored audio data from the memory 107 are effected in parallel. For the U seconds from the completion of the reproduction of the program area of the A plane to the start of the reproduction of the program area of the B plane, the audio data stored in the memory 107 is sequentially read. After the start of the reproduction of the program area of the B plane, the storing of the reproduction audio data and the reading of the prior stored data of (T-U) seconds are effected in parallel.

At step 913, an instruction for fast tape forwarding is issued to the mechanical control portion 102.

At step 914, the processing proceeds to step 915 upon the detection of EID=1.

At step 915, an instruction to start the reproduction mode is issued to the mechanism control portion 102.

At step 916, the processing proceeds to step 917 when the current reproduced frame is in a lead out area.

At step 917, the processing branches to step 919 when the continuous recording flag CF=0 in the lead out area, and the processing branches to step 918 when the continuous recording flag CF=1.

At step 919, an instruction for rewinding reproduction of fourteen frames is issued to the mechanism control portion 102.

At step 918, an instruction for reversing the tape running direction is issued to the mechanism control portion 102.

At step 921, a frame location where the end ID (EID) has changed from 0 to 1, and a frame location where the lead out area ID (LOID) has changed from 0 to 1 during the rewinding reproduction are detected and stored.

Namely, when CF=0 at the processing step 917, a fourteen frame portion tape is rewound and the processing enters into a standby condition for connecting data recording.

On the other hand, when CF=1 at the processing step 917, the tape running direction is reversed to effect the processing step 913 again. Since the condition CF=1 normally appears on only one of the A plane or B plane, processing step 919 is carried out after processing step 917 is effected for the second time, and the fourteen frame portion of tape is rewound into the standby condition for the connecting data recording operation. If for some reason processing step 917 is carried out three times or more, as in a case where CF=1 is detected in the lead out area of both the A plane and the B plane, a protection step for stopping the processing may be provided.

At step 922, the processing proceeds to step 923 when the user has instructed the start of connecting data recording via the recording and reproducing mode setting portion 106.

At step 923, the processing proceeds to step 924 when the current reproduced frame is a frame located before the frame where the end ID (EID) has changed from 0 to 1.

At step 924, the processing branches to step 925 when the current reproduced frame is a frame located before the frame where the lead out area ID (LOID) has changed from 0 to 1 and the processing branches to step 926 when the current reproduced frame is not a frame located before the frame where the lead out area ID (LOID) has changed from 0 to 1.

At step 926, an instruction for recording new auxiliary data only is issued to the mechanism control portion 102 and the recording and reproducing portion 104.

At step 925, an instruction for recording both the new auxiliary data and the audio data is issued to the mechanism control portion 102 and the recording and reproducing portion 104.

When the user has specified continuous reproduction of the A plane and B plane as described hereinabove, the audio data may be reproduced continuously even during the shifting from the A plane to the B plane.

Also, assume that the capacity of the memory 107 is T seconds worth of reproduced data, and the time expended from the completion of the final frame of the lead out area of one plane to the start of the first frame of the program area of the other plane is U seconds, a restriction as expressed in the following equation (1) is provided with respect to the number of times (frequency N) in which continuous reproduction may be repetitively effected when the continuous recording flag CF=1 in the lead out area of both plane.

$$N < T/U \qquad (1)$$

There is no such restriction in the frequency N in a case where the continuous recording flag CF=0 in the lead out area of either of the planes.

Since the audio data of T seconds is normally kept stored in the memory 107 if the tape speed is made faster than the normal speed during the recording and reproducing operation, there is no such restriction as in the equation (1) regarding the number of times (frequency N) in which the continuous reproduction may be repetitively effected even in a case where the continuous recording flag CF=1 in the lead out area on both plane.

If the end ID (EID=1) is detected when the user has specified the recorded data region end search, and if the continuous recording flag CF=1 when the reproduction mode has been entered, the tape running direction is immediately reversed in the lead out area, and the end searching is effected on the reverse plane. When the continuous recording flag CF=0, a standby condition is entered for the connecting data recording.

Since the end ID (EID=1) is recorded for a sixteen frame portion with respect to the four frames of the lead out area, the probability of missing the end ID is reduced.

Also, when the user instructs the connecting data recording after the data region end searching, the connecting audio data is not recorded in a tape region from the rising to 1 of the end ID (EID=1) to the rising to 1 of the lead out area ID (LOID=1), and only the auxiliary data is rewritten in this region, so that the previously recorded audio data is not erased. In the tape region beginning at the frame in which the lead out area ID (LOID=1) rises, both the auxiliary data and the connecting audio data are recorded.

A data recording method, a recorded data region end search method and a connecting data recording method in a third embodiment of the present invention will be described hereinafter.

Figure 12:
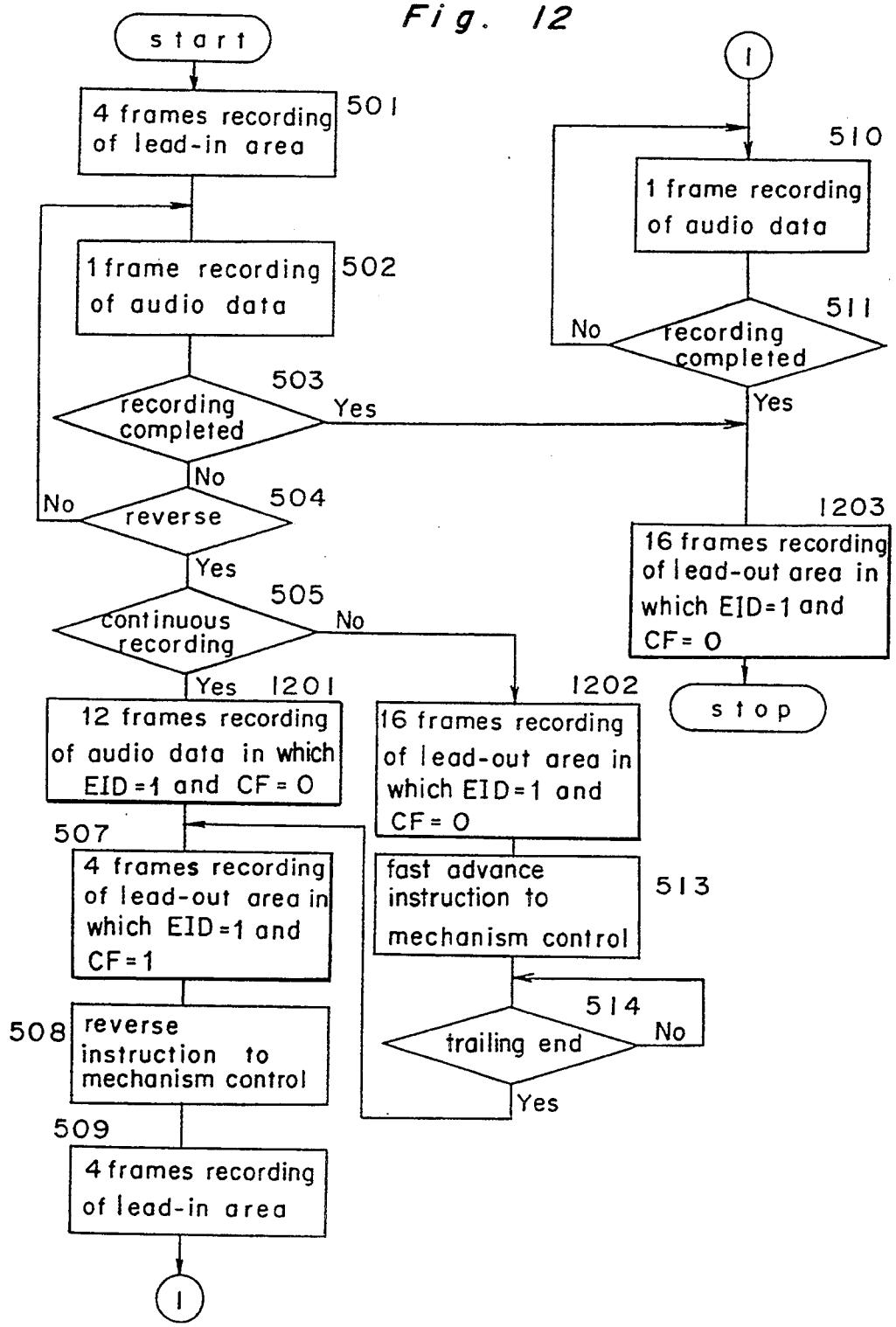
FIG. 12 is a flow chart showing the procedure of a data recording method in a third embodiment of the present invention.

FIG. 12 is a flow chart showing the data recording method in the third embodiment of the present invention. The processing is carried out in the system control portion 105 of FIG. 1.

At step 501, a four frame lead out area is recorded from the leading edge of the A plane. It is to be noted that a frame is a minimum unit which can be recorded independently on the tape.

At step 502, one frame of the audio data is recorded.

At step 503, the processing branches to step 1203 when a recording completion instruction has been received from the recording and reproducing mode setting portion 106, and otherwise the processing branches to step 504.

At step 1203, a sixteen frame lead out area is recorded in which the EID=1 and the continuous recording flag CF=0 to complete the recording.

At step 504, the processing proceeds to step 505 when an instruction for reversing the tape running direction has been received from the recording and reproducing mode setting portion 106, and otherwise the processing returns to step 502. Namely, the processing steps 502 through 504 are repeated until an instruction for reversing the tape running direction or a record complete instruction is received.

At step 505, the processing branches to step 1201 when an instruction for continuous data recording is received from the recording and reproducing mode setting portion 106, and otherwise the processing branches to step 1202.

At step 1201, when a continuous data recording instruction has been issued, twelve frames the audio data are recorded in which the EID=1 and the continuous recording flag CF=0.

At step 507, a four frame lead out area is recorded in which the EID=1, the continuous recording flag CF=1, the lead out area ID (LOID)=1.

At step 508, an instruction for reversing the tape running direction is issued to the mechanism control portion 102.

At step 509, a four frame lead in area is recorded in the B plane.

At step 510, one frame of the audio data is recorded.

At step 511, the processing proceeds to stop 1203 when a recording completion instruction has been received from the recording and reproducing mode setting portion 106, and otherwise the processing returns to step 510 to continue recording of audio data.

At step 1202, a sixteen frame lead out area in which the EID=1, the continuous recording flag CF=0, and the lead out area ID (LOID)=1.

At step 513, a fast advance instruction is issued to the mechanism control portion 102.

At step 514, the processing proceeds to step 508 when an indication is received that the trailing end of the tape has been received from the mechanism control portion 102.

For example, control data as shown in FIG. 13 is recorded on the tape.

FIG. 13 is a control data layout chart in a case where the continuous data recording on both planes is effected in the third embodiment of the present invention.

When the tape running direction is reversed to continue recording onto the reverse plane, the end ID is raised to 1 prior to the lead out area, and when the recording is completed on the reverse plane, the end ID is raised to 1 coincident with the start of the lead out area.

In this case, when the automatic recorded data region search method of FIG. 6(b) and (c) is effected as in the first embodiment of the present invention, the lead out area for completing the recording on the B plane, namely, the lead out area where the end ID rises to 1 at the start of the lead out area, is to be searched.

In FIG. 6(b) and (c), when the recorded data region end searching starts from the A plane, the continuous recording flag CF=1 is detected at processing step 615 to reverse the tape running direction at processing step 616 to thus search the B plane. When the processing step 615 is effected again, CF will not equal 1, and the processing steps 617 and 619 are effected to thus enter the standby condition of the connecting data recording.

Then, when an instruction for connecting data recording is issued from the recording and reproducing operation mode setting portion 106, the processing step 621 is effected. In the case of a tape recorded using the data recording method in the third embodiment, the end ID and the lead out area ID become 1 at the same time, so that the processing steps 622 and 623 are effected. Namely, the recording of the audio data and the recording the auxiliary data start when the connecting data recording instruction is issued.

In a case of the data recording method of the first embodiment of the present invention, the recording of the new audio data cannot start immediately if the connecting data recording instruction is issued in a section where audio data is previously recorded from the rising of the end ID to the lead out area, since the end ID is made inactive (i.e. made 0) by rewriting of the auxiliary data only, and the previously recorded audio data is not erased. In the case of the third embodiment, more time is required during recording to write the sufficient length of lead out area from the completion of the recorded audio data, but during connecting data recording, the recording of the new audio data may be started immediately when the connecting data recording instruction is issued, so that head cutting is not caused in a case where the recording must be effected in an emergency.

As is clear from the foregoing description, in the data recording method, the recorded data region end search method, and the connecting data recording method of the present invention, at the time of recording, an end ID is changed from inactive to active (i.e. from 0 to 1) before the recorded data completion point. At the same time the end ID is changed from inactive to active, or after the end ID is changed from inactive to active, the recording of the main data is interrupted to record the lead out area and to make the lead out area ID active. The continuous recording flag is made active (i.e. is made 1) where the lead out area ID of at least a first plane is active when the recording completion point of the first plane coincides with the recording start point of the second plane. At the time of conducting an end search, the lead out area is reproduced upon the detection of the end ID. Rewinding reproduction is then effected when the continuous recording flag is not detected, and a frame location where the end ID has changed from inactive to active and a frame location where the lead out area ID has changed from inactive to active are stored, or only a frame location where the lead out area ID has been changed from inactive to active is stored. The tape running direction is reversed to effect the end search upon detection of the continuous recording flag. At the time of connecting data recording, the recording of the new auxiliary data is started from the frame where the end ID is changed from inactive to active prior to the lead out area ID. Both auxiliary data and the main data are recorded from the frame where the lead out area ID becomes active. The end search of the reverse plane is started by the immediate reversing of the tape running direction when the continuous recording flag is detected in the lead out after the detection of the end ID. The frames in which the end ID and the lead out area ID become active are stored during the rewinding reproduction when the continuous recording flag has not been detected in the lead out area for entering into the standby condition for the connecting data recording. Thus, the recording completion point of the entire tape may be automatically searched.

Since the end (EID=1) is made longer than the recording section of the lead out area and the continuous recording flag, the probability of missing the end ID during the end search is reduced, and also, the recording of the lead out area is made sufficiently shorter so that, in the reversing of the tape running direction at the time of recording, the recording interruption period may be made shorter.

In the data recording method of the present invention, shortening the recording interruption period caused during the tape running direction reversal has been described by the provision of a shorter recording period of the lead out area ID and the continuous recording flag showing a data continuity from the A plane to the B plane, but the recording interruption period may be further reduced by non-recording of the lead out area subsequent to the recording completion point. In this case, the end ID recording section length is determined to be a constant value so that the recording completion point of the main data may be definitely decided, or the recording completion point of the main data is required to be positively decided if the section subsequent the recording completion point main data is non-recorded by the provision of an address into the end ID section. Also, in this case, the continuous recording flag need only to be recorded in the same section as the end ID, instead of in the lead out area.

When the recording section of the end ID is longer than the recording section of the lead out area and the continuous recording flag, in the tape section from the rising to 1 of the end ID to the rising to 1 of the lead out area ID, the connecting data recording may be realized without erasure of the prior recorded main data written up to the lead out area, and only the auxiliary data is rewritten in this section.

When the recording completion point of the first plane coincides with the recording starting point of the second plane, the data recording method of the present invention changes from inactive to active the end ID before the recording completion point, changes the lead out area ID from inactive to active after the end ID has become effective, and makes the continuous recording flag active in a section where at least the lead out area ID of the first plane is located. When the recording completion point of the first plane does not coincide with the recording starting point of the second plane, the end ID and the lead out read ID are changed from inactive to active at the same time before the recording completion point. When the recording operation is effected continuously onto the reverse plane by reversing the tape running direction, namely, when the continuous recording flag is active, the end ID is raised prior to the lead out area to reduce the time from the completion of the main data recording to the recording end of the lead out area. When the recording is completed within the plane, namely, when the continuous recording flag is not active, the end ID is made active at the start of the lead out area. When the connecting data recording is effected with the continuous recording flag corresponding to the recording completion point at the entire tape being provided as a guide, the main data and the auxiliary data are recorded at the same time from the starting point of the lead out area, so that the recording of the main data may be started immediately when the connecting data recording instruction is issued.

Although the present invention has been fully described by way of example with reference to the accompanying drawings, it is to be noted here that various changes and modifications will be apparent to those skilled in the art. Therefore, unless otherwise such changes and the modifications depart from the scope of the present invention, they should be constructed as included therein.

What is claimed is:

1. In a data recording method in which successive frames of main data and successive frames of auxiliary data are recorded on respective adjacent recording tracks of a recording tape, the auxiliary data including control information, the improvement comprising a step of recording a main data completion point indication at a location in the recording track of the auxiliary data prior to a corresponding location of the recording track of the main data at which recording of the main data is completed.

2. In a data recording method for recording successive frames of main data and successive frames of auxiliary data on respective adjacent recording tracks of a recording tape, the auxiliary information including control information, the recording tape being recordable in a first plane while being advanced in a first direction and being recordable in a second plane while being advanced in an opposite second direction, the improvement comprising:
    a step of recording a main data completion point indication in the first plane of the recording tape at a location in the recording track of the auxiliary data prior to a corresponding location of the recording track of the main data at which recording of the main data in the first plane of the recording tape is completed; and
    a step of recording a continuous data flag in the first plane of the recording tape at a location in the recording track of the auxiliary data corresponding to the location the recording track of the main data at which recording of the main data in the first plane of the recording tape is completed, the continuous data flag indicating that the recorded main data continues at a corresponding location of the second plane of the recording tape.

3. In a data recording method in which successive frames of main data and successive frames of auxiliary data are recorded on respective adjacent recording tracks of a recording tape, the auxiliary data including control information, the improvement comprising:
    a step of recording a main data completion point indication at a location in of the recording track of the auxiliary data prior to a corresponding location in the recording track of the main data at which recording of the main data is completed; and
    a step of recording a lead out area indication at a location in the recording track of the auxiliary data corresponding to the location in the recording track of the main data at which recording of the main data is completed.

4. In a data recording method for recording successive frames of main data and successive frames of auxiliary data on respective adjacent recording tracks of a recording tape, the auxiliary information including control information, the recording tape being recordable in a first plane while being advanced in a first direction and being recordable in a second plane while being advanced in an opposite second direction, the improvement comprising:
    a step of recording a main data completion point indication in the first plane of the recording tape at a location in the recording track of the auxiliary data prior to a corresponding location in the recording track of the main data at which recording of the main data in the first plane of the recording tape is complete;
    a step of recording a lead out area indication in the first plane of the recording tape at a location in the recording track of the auxiliary data corresponding to the location in the recording track of the main data at which recording of the main data is completed; and
    a step of recording a continuous data flag in the first plane of the recording tape at a location in the recording track of the auxiliary data corresponding to the location in the recording track of the main data at which recording of the main data in the first plane of the recording tape is completed, the continuous data flag indicating that the recorded main data continues at a corresponding location of the second plane of the recording tape.

5. In a data recording method for recording successive frames of main data and successive frames of auxiliary data on respective adjacent recording tracks of a recording tape, the auxiliary information including control information, the recording tape being recordable in a first plane while being conveyed in a first direction and being recordable in a second plane while being conveyed in an opposite second direction, the improvement comprising:
    a step of recording a first main data completion point indication in the first plane of the recording tape at a location in the recording track of the auxiliary data prior to a corresponding location in the recording track of the main data at which recording of the main data in the first plane of the recording tape is completed;
    a step of recording a first lead out indication in the first plane of the recording tape at a location in the recording track of the auxiliary data corresponding to the location in the recording track of the main data at which recording of the main data is completed;
    a step of recording a continuous data flag in the first plane of the recording tape at a location in the recording track of the auxiliary data corresponding to the location in the recording track of the main data at which recording of the main data in the first plane of the recording tape is completed, the continuous data flag indicating that the recorded main data continues at a corresponding location of the second plane of the recording tape;
    a step of recording a second main data completion point indication in the second plane of the recording tape at a location in the recording track of the auxiliary data prior to a corresponding location in the recording track of the main data at which recording of the main data in the second plane of the recording tape is completed; and
    a step of recording a second lead out indication in the second plane of in the recording tape at a location in the recording track of the auxiliary data corresponding to the location in the recording track of the main data at which recording of the main data in the second plane of the recording tape is completed.

6. A data recording method for recording successive frames of main data and successive frames of auxiliary data on respective adjacent recording tracks of a recording tape, the auxiliary information including control information, the recording tape being recordable in a first plane while being advanced in a first direction and being recordable in a second plane while being advanced in an opposite second direction, said method comprising:

a step of storing the main data in a memory;

a step of reading the main data from the memory and recording the thus read main data in successive frames of the recording track of the main data of the first plane of the recording tape;

a step of recording a first main data completion point indication in the first plane of the recording tape at a location in the recording track of the auxiliary data prior to a corresponding location in the recording track of the main data at which recording of the main data is completed in the first plane of the recording tape;

a step of recording a first lead area out indication in the first plane of the recording tape at a location in the recording track of the auxiliary data corresponding to the location in the recording track of the main data at which recording of the main data is completed;

a step of recording a continuous data flag in the first plane of the recording tape at a location in the recording track of the auxiliary data corresponding to the location in the recording track of the main data at which recording of the main data in the first plane of the recording tape is completed, the continuous data flag indicating that the recorded main data continues at a corresponding location of the second plane of the recording tape; and, a step of continuing recording of the read main data in the second plane of the recording tape starting at a location corresponding to the continuous data flag recorded in the first plane of the recording tape.

7. A method of recording connecting main data and associated auxiliary data on a recording tape such that the connecting main data adjoins already recorded main data having already recorded auxiliary data associated therewith, the main data and auxiliary data being recorded in successive frames on respective adjacent recording tracks of the recording tape, the auxiliary data including control information, said method comprising:

a step of advancing the recording tape in a first direction and detecting, within the already recorded auxiliary data, a main data completion point indication which is positioned at a location in the recording track of the auxiliary data prior to a corresponding location in the recording track of the main data at which recording of the already recorded main data is completed;

a step of recording new auxiliary data, upon detection of the main data completion point indication, in the recording track of the auxiliary data while advancing the recording tape in the first direction and prior to reaching the corresponding location in the recording track of the main data at which recording of the already recorded main data is completed; and, a step of recording both new auxiliary data and the connecting main data while advancing the recording tape in the first direction when the corresponding location of the main data track at which recording of the already recorded main data is completed has been reached.

8. A method of recording connecting main data and associated auxiliary data on a recording tape such that the connecting main data adjoins already recorded main data having already recorded auxiliary data associated therewith, the main data and auxiliary data being recorded in successive frames on respective adjacent recording tracks of a recording tape, the auxiliary data including control information, said method comprising:

a step of advancing the recording tape in a first direction and detecting, within the already recorded auxiliary data, a main data completion point indication which is positioned at a location in the recording track of the auxiliary data prior to a corresponding location in the recording track of the main data at which recording of the already recorded main data is completed and a lead out indication which is positioned at a location in the recording track of the auxiliary data corresponding the location in the recording track of the main data at which the already recorded main data is completed;

a step of advancing the recording tape in an opposite second direction a predetermined amount and then again advancing the recording tape in the first direction and recording new auxiliary data in the recording track of the auxiliary data after the detected main data completion indication and prior to the detected lead out area indication; and, a step of recording both the new auxiliary data and the connecting main data while advancing the recording tape in the first direction after the detected lead out area indication.

9. A method for searching a recording tape for the location at which a region of recorded main data ends, the main data and associated auxiliary data being recorded in successive frames on respective adjacent recording tracks of the recording tape, the auxiliary information including control information, the recording tape being recordable in a first plane while being advanced in a first direction and being recordable in a second plane while being advanced in an opposite second direction, said method comprising:

a step of advancing the recording tape in the first direction and reproducing auxiliary data recorded in the first plane of the recording tape;

a step of detecting within the reproduced auxiliary data of the first plane of the recording tape a recorded data region end indication and a recorded continuing data indication;

a step of stopping advancement of the recording tape in the first direction when the recorded data region end indication is detected in the reproduced auxiliary data of the first plane of the recording tape;

a step of entering a standby mode when the continuing data indication is not detected in the reproduced auxiliary data of the first plane of the recording tape, advancing the recording tape in the second direction and reproducing auxiliary data recorded in the second plane of the recording tape when the continuing data indication is detected in the reproduced auxiliary data of the first plane of the recording tape; and, a step of detecting within the reproduced auxiliary data of the second plane of the recording tape a recorded data region end indication and stopping advancement of the recording tape in the second direction when the recorded data region end indication is detected in the reproduced auxiliary data of the second plane of the recording tape.

10. A method for searching a recording tape for the location at which a region of recorded main data ends, the main data and associated auxiliary data being recorded in successive frames on respective adjacent tracks of the recording tape, the auxiliary information including control information, the recording tape being recordable in a first plane while being advanced in a first direction and being recordable in a second plane while being advanced in an opposite second direction, said method comprising:

a step of advancing the recording tape in the first direction and reproducing auxiliary data recorded in the first plane of the recording tape;

a step of detecting, within the reproduced auxiliary data of the first plane of the recording tape, a recorded data region end indication and continuing data indication, the recorded data region end indication being located at a position in the recording track of the auxiliary data prior to a corresponding location in the recording track of the main data at which the recorded main data ends in the first plane;

a step of entering a reproduction mode in which the recording tape is advanced in the first direction and the recording track of the main data in the first plane is reproduced when the recorded data region end indication is detected in the reproduced auxiliary data of the first plane of the recording tape;

a step of entering a rewind reproduction mode in which the recorded tape is advanced in the second direction a o predetermined amount and the location of the recorded data region end indication in the reproduced auxiliary data of the first plane of the recording tape is stored in a memory and then entering a standby mode when the continuing data indication is not detected in the reproduced auxiliary data of the first plane of the recording tape, a step of advancing the recording tape in the second direction and reproducing the auxiliary data recorded in the second plane of the recording tape when the continuing data indication is detected in the reproduced auxiliary data of the first plane of the recording tape; and, a step of detecting within the reproduced auxiliary data of the second plane of the recording tape a recorded data region end indication and stopping advancement of the recording tape in the second direction when the recorded data region end indication is detected in the reproduced auxiliary data of the second plane of the recording tape.

* * * * *